United States Patent
Bhate et al.

(10) Patent No.: US 12,119,630 B2
(45) Date of Patent: Oct. 15, 2024

(54) TEMPERATURE CONTROL DEVICE MOUNTED TO A SEALED ELECTRICAL WALL BOX

(71) Applicant: Lutron Technology Company LLC, Coopersburg, PA (US)

(72) Inventors: Nikhil V. Bhate, East Norriton, PA (US); Joseph M. Nichols, Boyertown, PA (US); Sean Tucker, Bethlehem, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 18/354,758

(22) Filed: Jul. 19, 2023

(65) Prior Publication Data

US 2023/0361546 A1    Nov. 9, 2023

Related U.S. Application Data

(63) Continuation of application No. 17/170,372, filed on Feb. 8, 2021, now Pat. No. 11,735,898, which is a
(Continued)

(51) Int. Cl.
*H02G 3/08*    (2006.01)
*F24F 11/89*    (2018.01)
(Continued)

(52) U.S. Cl.
CPC .............. *H02G 3/088* (2013.01); *F24F 11/89* (2018.01); *H02G 3/083* (2013.01); *H02G 3/12* (2013.01);
(Continued)

(58) Field of Classification Search
CPC .......... H02G 3/088; H02G 3/083; H02G 3/12; H02G 3/123; H02G 3/14; H02G 3/22;
(Continued)

(56) References Cited

U.S. PATENT DOCUMENTS 2,225,472 A    12/1940 Franklin
3,998,384 A    12/1976 Martin et al.
(Continued)

FOREIGN PATENT DOCUMENTS

DE    102011018758 A1    10/2012
JP    H11346422 A    12/1999
WO    WO2015167656 A1    11/2015

*Primary Examiner* — Angel R Estrada
(74) *Attorney, Agent, or Firm* — Michael S. Czarnecki; Glen R. Farbanish; Philip N. Smith

(57) ABSTRACT

A control system may include a control device, an electrical wall box having a hole for passing a wire or cable into the wall box, and a gland configured to be inserted into the hole of the wall box. The control device may include a temperature sensor. The wall box may be configured to be mounted to a wall. The control device may be configured to be mounted to the wall box such that the temperature sensor is located within the wall box. A wire or cable may be passed from a wall cavity of the wall, through the gland, into an interior of the wall box, and attached to the temperature control device. The gland and the wall box may be configured to prevent air within the wall cavity from entering the wall box when the wire or cable is passed into the wall box.

15 Claims, 9 Drawing Sheets

Related U.S. Application Data continuation of application No. 16/153,406, filed on Oct. 5, 2018, now Pat. No. 10,916,925.

(60) Provisional application No. 62/569,205, filed on Oct. 6, 2017.

(51) Int. Cl.
*H02G 3/12* (2006.01)
*H02G 3/14* (2006.01)
*H02G 3/22* (2006.01)
*G05D 23/19* (2006.01)

(52) U.S. Cl.
CPC ............... *H02G 3/123* (2013.01); *H02G 3/14* (2013.01); *H02G 3/22* (2013.01); *G05D 23/19* (2013.01)

(58) Field of Classification Search
CPC ........... H02G 3/08; H02G 3/081; F24F 11/89; G05D 23/19
USPC ....... 174/50, 53, 57, 58, 650, 480, 481, 502, 174/539, 152 R, 153 G, 152 G, 135; 16/2.1, 2.2; 220/3.2–3.9, 4.02
See application file for complete search history.

(56) References Cited

U.S. PATENT DOCUMENTS

| | | |
|---|---|---|
| 4,266,683 A | 5/1981 | Sellinger |
| 5,296,647 A | 3/1994 | Banker |
| 5,558,436 A | 9/1996 | Richards |
| 5,567,916 A | 10/1996 | Napiorkowski et al. |
| 5,726,392 A | 3/1998 | Farr et al. |
| 5,836,048 A | 11/1998 | Rossman et al. |
| 6,032,867 A | 3/2000 | DuShane et al. |
| 6,119,305 A | 9/2000 | Loveall et al. |
| 6,285,912 B1 | 9/2001 | Ellison et al. |
| 6,768,058 B2 | 7/2004 | Pallapothu |
| 6,798,341 B1 | 9/2004 | Eckel et al. |
| 6,895,634 B2 | 5/2005 | Tisbo |
| 7,812,253 B2 | 10/2010 | Moselle |
| 7,930,800 B1 | 4/2011 | Castrale et al. |
| 8,033,408 B2 | 10/2011 | Makela et al. |
| 8,089,032 B2 | 1/2012 | Beland et al. |
| 8,163,995 B2 | 4/2012 | Donaldson |
| 8,664,543 B2 | 3/2014 | Chen |
| 8,686,287 B1 | 4/2014 | Gretz |
| 8,802,981 B2 | 8/2014 | Wallaert et al. |
| 10,916,925 B2 * | 2/2021 | Bhate ...................... H02G 3/22 |
| 11,735,898 B2 * | 8/2023 | Bhate ..................... H02G 3/083 174/502 |
| 2009/0139742 A1 | 6/2009 | Bhosale |
| 2014/0270221 A1 | 9/2014 | Taylor et al. |
| 2014/0368977 A1 | 12/2014 | Lenny |

\* cited by examiner

TEMPERATURE CONTROL DEVICE MOUNTED TO A SEALED ELECTRICAL WALL BOX

CROSS-REFERENCE TO RELATED APPLICATIONS

This application is a continuation of U.S. patent application Ser. No. 17/170,372, filed Feb. 8, 2021; which is a continuation of U.S. patent application Ser. No. 16/153,406, filed Oct. 5, 2018, now U.S. Pat. No. 10,916,925, issued Feb. 9, 2021; both of which claim the benefit of U.S. Provisional Patent Application No. 62/569,205, filed Oct. 6, 2017, the entire disclosures of which are incorporated by reference herein.

BACKGROUND

Home automation systems, which have become increasingly popular, may be used by homeowners to integrate and control multiple electrical and/or electronic devices in their homes. For example, a homeowner may connect appliances, lights, blinds, thermostats, cable or satellite boxes, security systems, telecommunication systems, and the like to each other via a wireless network. The homeowner may control these electrical and/or electronic devices using a system controller, a remote control device (e.g., such as a wall-mounted keypad), a user interface provided via a phone, a tablet, a computer, and/or the like, directly connected to the network or remotely connected via the Internet. These electrical and/or electronic devices may communicate with each other and/or the controller to, for example, improve their efficiency, their convenience, and/or their usability.

However, some of these devices may interact with one another and their respective environments in detrimental ways. For example, a thermostat may include a display screen, and the display screen may give off heat when it is operating. The heat given off by the display screen may throw off the measurements provided by the thermostat, such that the thermostat is unable to determine the true temperature in a space, and as such, is unable to properly control the temperature of the space. Moreover, the display screen may operate in a multitude of varying intensities that may each give off a differing amount of heat, further complicating this problem. Hence, there is a need to ensure that devices, like thermostats, properly operate in varying conditions and environments.

SUMMARY

The present disclosure relates in one aspect to a temperature control device being mounted to a sealed electrical wall box. As described herein, a temperature control system may include the temperature control device, the sealed electrical wall box, and one or more glands. The temperature control device may include a temperature sensor. The sealed electrical wall box may be configured to be flush mounted to a wall. The sealed electrical wall box may define a flange configured to engage an outer surface of a wall. The sealed electrical wall box may define a back plate that is distal from the flange. The temperature control device may be configured to be mounted to the sealed electrical wall box such that the temperature sensor is located within the sealed electrical wall box. The sealed electrical wall box may be configured to prevent air within a wall cavity of the wall from entering the sealed electrical wall box. For example, the sealed electrical wall box may be configured to provide a substantially airtight seal between the wall cavity and the sealed electrical wall box. The sealed electrical wall box may be configured to receive one or more electrical cables and/or electrical wires from the wall cavity, for example, for power and/or control of the temperature control device. For example, the back plate may include one or more holes configured to receive the electrical cable(s) and/or the electrical wire(s). The holes may have a first diameter.

The glands may be configured to be removably secured within the holes. The glands may be configured to receive electrical cables and/or electrical wires of various thicknesses. For example, the glands may be configured to receive electrical cables and/or electrical wires having varying thicknesses including, for example, cables having diameters ranging from 0.17 inches to 0.325 inches for example, although smaller and larger diameter wires and cables may be used. Each of the glands may define a front portion, an intermediate portion, and a rear portion. The front portion may be tapered from a front surface to an intermediate surface. The front surface may define a second diameter that may be less than the first diameter such that the each of the glands may be configured to be pressed into a respective hole of the holes. The intermediate surface may have a third diameter that may be greater than the first diameter. The intermediate surface may be configured to rest against the back plate. The intermediate portion may have a fourth diameter that may be less than or equal to the first diameter. The intermediate portion may have a length that may be substantially equivalent to a thickness of the back plate. The rear portion may define a first surface that may be configured to rest against the back plate. The rear portion may define a second surface having an area that may be star-shaped. The star shaped area may be configured to receive an electrical cable and/or an electrical wire having varying thicknesses. The second surface may be initially sealed and may be punctured by the electrical cable and/or electrical wire to form an aperture. When the second surface is punctured, the aperture may be configured to form a substantially airtight seal around the electrical cable and/or electrical wire.

The above advantages and features are of representative embodiments only. They are not to be considered limitations. Additional features and advantages of embodiments will become apparent in the following description, from the drawings, and from the claims.

DETAILED DESCRIPTION

Figure 1:
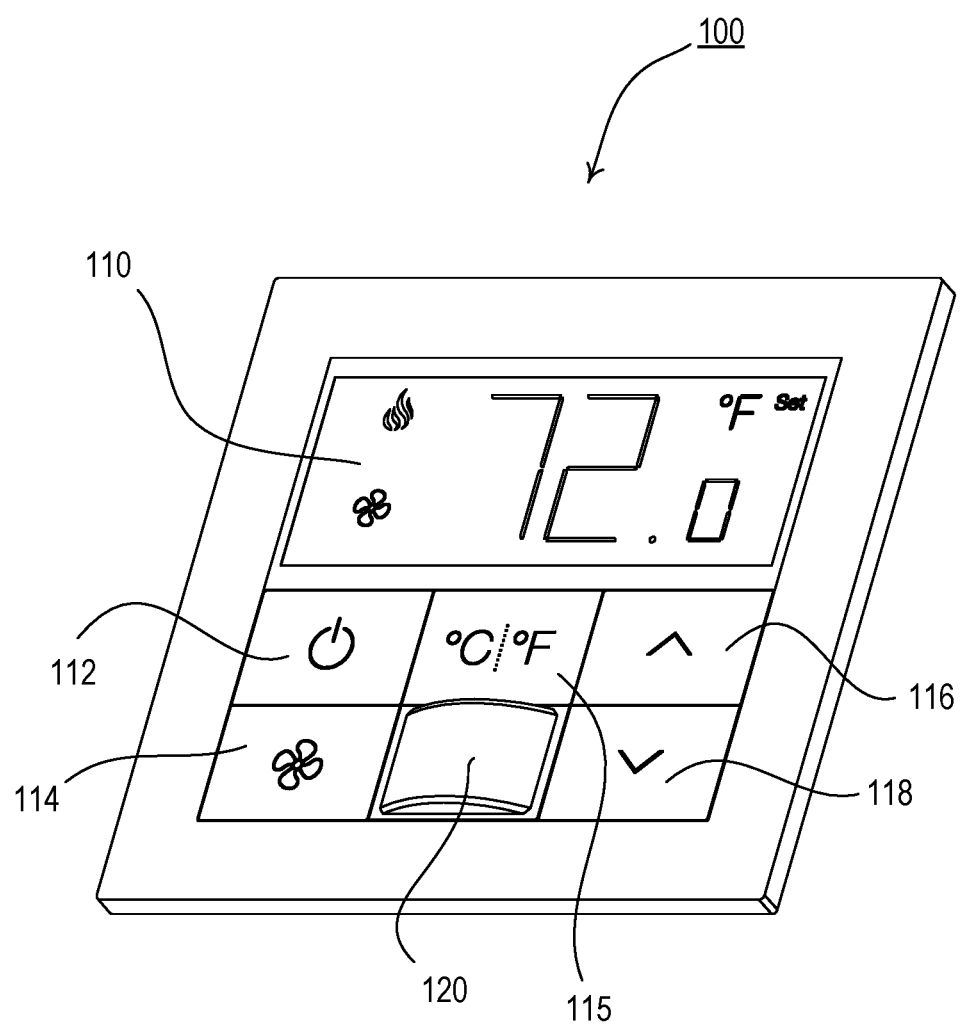
FIG. 1 is a perspective view of an example temperature control device (e.g., a wall-mounted thermostat).

FIG. 1 is a perspective view of an example temperature control device (e.g., a wall-mounted thermostat 100) for controlling a heating, ventilation, and air conditioning (HVAC) system. The thermostat 100 may be configured to control the HVAC system to adjust a present temperature $T_{PRES}$ in a space in which the thermostat is installed towards a setpoint temperature $T_{SET}$. The thermostat 100 may include an internal temperature sensor (not shown) for measuring the present temperature $T_{PRES}$ in the space.

The thermostat 100 may be configured to communicate (e.g., transmit and/or receive) digital messages with one or more external control devices via a network communication link. The network communication link may include a wired communication link or a wireless communication link, such as a radio-frequency (RF) communication link. The thermostat 100 may be configured to adjust the setpoint temperature $T_{SET}$ in response to messages, such as digital messages, that are received via the communication link. In addition, the thermostat 100 may be configured to transmit the present temperature $T_{PRES}$ and/or the setpoint temperature $T_{SET}$ via one or more messages, such as digital messages, via the communication link. One will recognize that thermostat 100 may transmit and/or receive other messages via the network communication link. The thermostat 100 may be coupled to the HVAC system via a digital communication link for example, such as an Ethernet link, a BACnet® link, or a Modbus link. The HVAC system may include, for example, a building management system (BMS). Alternatively and/or additionally, the communication link with the HVAC system may include a traditional analog control link. Thermostat 100 may communicate control messages through such a communication link in order to control the HVAC system (e.g., for turning the HVAC system on and off, for controlling a fan speed of the HVAC system, for controlling a mode of the HVAC system (e.g., heating or cooling), etc.) and/or to receive messages from the HVAC system, such as status message. Other examples are possible. Examples of load control systems having temperature control devices, such as the thermostat 100, are described in greater detail in commonly-assigned U.S. Patent Application Publication No. 2012/0091213, published Apr. 19, 2012, entitled WALL-MOUNTABLE TEMPERATURE CONTROL DEVICE FOR A LOAD CONTROL SYSTEM HAVING AN ENERGY SAVINGS MODE, and U.S. Patent Application Publication No. 2014/0001977, published Jan. 2, 2014, entitled LOAD CONTROL SYSTEM HAVING INDEPENDENTLY-CONTROLLED UNITS RESPONSIVE TO A BROADCAST CONTROLLER, the entire disclosures of which are hereby incorporated by reference.

The thermostat 100 may be configured to control the HVAC system in response to occupancy and/or vacancy conditions in the space around (e.g., in the vicinity of) the thermostat 100. The thermostat 100 may include an internal detector, e.g., a pyroelectric infrared (PIR) detector, for receiving infrared energy from an occupant(s) in the space via a lens 120 to sense the occupancy or vacancy condition in the space. Alternatively or additionally, the internal detector may include an ultrasonic detector, a microwave detector, or any combination of PIR detectors, ultrasonic detectors, and microwave detectors. The thermostat 100 may be configured to turn the HVAC system on in response to detecting an occupancy condition in the space and to turn the HVAC system off in response to detecting a vacancy condition in the space. An example of a wall-mounted control device configured to control an electrical load in response to detecting occupancy and vacancy conditions is described in greater detail in commonly-assigned U.S. Patent Application Publication No. 2012/0313535, published Dec. 13, 2012, entitled METHOD AND APPARATUS FOR ADJUSTING AN AMBIENT LIGHT THRESHOLD, the entire disclosure of which is hereby incorporated by reference.

The thermostat 100 may include a visual display 110 for displaying the present temperature $T_{PRES}$ and/or the setpoint temperature $T_{SET}$. In addition, the visual display 110 may display a mode of the HVAC system (e.g., heating or cooling) and/or a status of a fan of the HVAC system (e.g., on or off, speed, etc.). The visual display 110 may include, for example, a liquid crystal display (LCD) screen or a light-emitting diode (LED) screen. The visual display 110 may be backlight by one or more lights sources (e.g., white backlight LEDs, although other mechanisms may be used). The thermostat 100 may include a power button 112 for turning on and off the HVAC system. The thermostat 100 may include a fan button 114 for turning on and off the fan (e.g., and for adjusting the speed of the fan) of the HVAC system. The thermostat 100 may also include a units-adjust button 115 for adjusting the units in which the present temperature $T_{PRES}$ and/or the setpoint temperature $T_{SET}$ are displayed on the visual display 110 (e.g., Celsius or Fahrenheit). The thermostat 100 may include a raise button 116 and a lower button 118 for respectively raising and lowering the setpoint temperature $T_{SET}$ of the thermostat. The thermostat 100 may also be configured to adjust the setpoint temperature $T_{SET}$ in response to the present time of day according to a predetermined timeclock schedule. The thermostat 100 may also include a mode button (not shown) for changing a mode of the HVAC system (e.g., heating or cooling).

One or more of the buttons 112-118 may include indicia, such as text or icons, indicating the specific function of the button. The buttons 112-118 may be backlit to allow the indicia to be read in a wide range of ambient light levels. Each button 112-118 may be made of a translucent (e.g., transparent, clear, and/or diffusive) material, such as plastic. The buttons 112-118 may be illuminated by one or more light sources (e.g., LEDs, although other mechanisms may be used) located behind each button (e.g., inside of the thermostat 100). In addition, the buttons 112-118 may each have an opaque surface such as a metallic surface. Specifically, each button 112-118 may have a translucent body (not shown) and an opaque material or sheet, e.g., a metallic sheet (not shown), adhered to a front surface of the body. The indicia may be etched into the opaque sheet, for example, of each button. The illumination from the LEDs may shine through the translucent body, but not through the opaque sheet, such that the indicium of each button (that is etched away from the opaque sheet for example) is illuminated. Other configurations of indicia are possible, such as text or icons that are printed on the buttons.

When the thermostat 100 is presently being used (e.g., a user is presently actuating one or more of the buttons 112-118), the thermostat may operate in an awake state in which the visual display 110 may be turned on and backlit and the buttons 112-118 may each be illuminated to an awake surface illumination intensity $L_{SUR1}$ (e.g., a bright level). When the thermostat 100 is not being used (e.g., the buttons 112-118 are not presently being actuated), the thermostat may operate in an idle state in which the backlight for the visual display 110 may be dimmed and the buttons 112-118 may each be illuminated to an idle surface illumination intensity $L_{SUR2}$ (e.g., a dim level). The thermostat 100 may be configured to wait for an amount of time after the last button press (e.g., approximately 10 seconds) before dimming the backlight for the visual display 110 and the LEDs, for example, behind the buttons 112-118. The intensity of the visual display 110 when in the idle state may be less than the intensity of the visual display when in the wake state, and similarly the surface illumination intensity $L_{SUR2}$ of the buttons 112-118 when in the idle state may be less than the surface illumination intensity $L_{SUR1}$ of the buttons when in the awake state. This may provide an energy savings when the thermostat 100 is in the idle state and/or may reduce the heat generated by the backlight LEDs, for example, when the thermostat 100 is in the idle state which may in turn improve the accuracy of the measurements of the present temperature $T_{PRES}$ by the internal temperature sensor when the thermostat 100 is in the idle state. In addition and/or alternatively, the visual display may be turned off and not backlit in the idle state, and the LEDs behind the buttons 112-118 may be turned off in the idle state for similar reasons of energy savings and/or to improve the accuracy of the measurements of the present temperature $T_{PRES}$ by the internal temperature sensor.

The ambient light level in the room in which the thermostat 100 is installed may affect a user's ability to read the indicia on the buttons 112-118. For example, if the contrast between the brightness of the illuminated indicia and the brightness of the adjacent surface of the button is too low, the illuminated indicia may appear washed out to the user. Accordingly, the thermostat 100 may include an ambient light detection circuit, which may be configured to measure the ambient light level in the room in which the thermostat is installed. For example, the ambient light detection circuit may be located behind the lens 120 and may receive light through the lens to make a determination of the ambient light level in the room. Alternatively, the thermostat 100 may include an opening (not shown) through which the ambient light detection circuit may receive light. The thermostat 100 may also include a light pipe for directing light from outside of the keypad to the ambient light detection circuit.

The thermostat 100 may be configured to adjust the awake and idle surface illumination intensities $L_{SUR1}$, $L_{SUR2}$ in response to the measured ambient light level. For example, the thermostat 100 may be configured to increase the awake and idle surface illumination intensities $L_{SUR1}$, $L_{SUR2}$ if the ambient light level increases, and decrease the awake and idle surface illumination intensities $L_{SUR1}$, $L_{SUR2}$ if the ambient light level decreases. Thermostat 100 is one example thermostat and other examples are possible.

Figure 2:
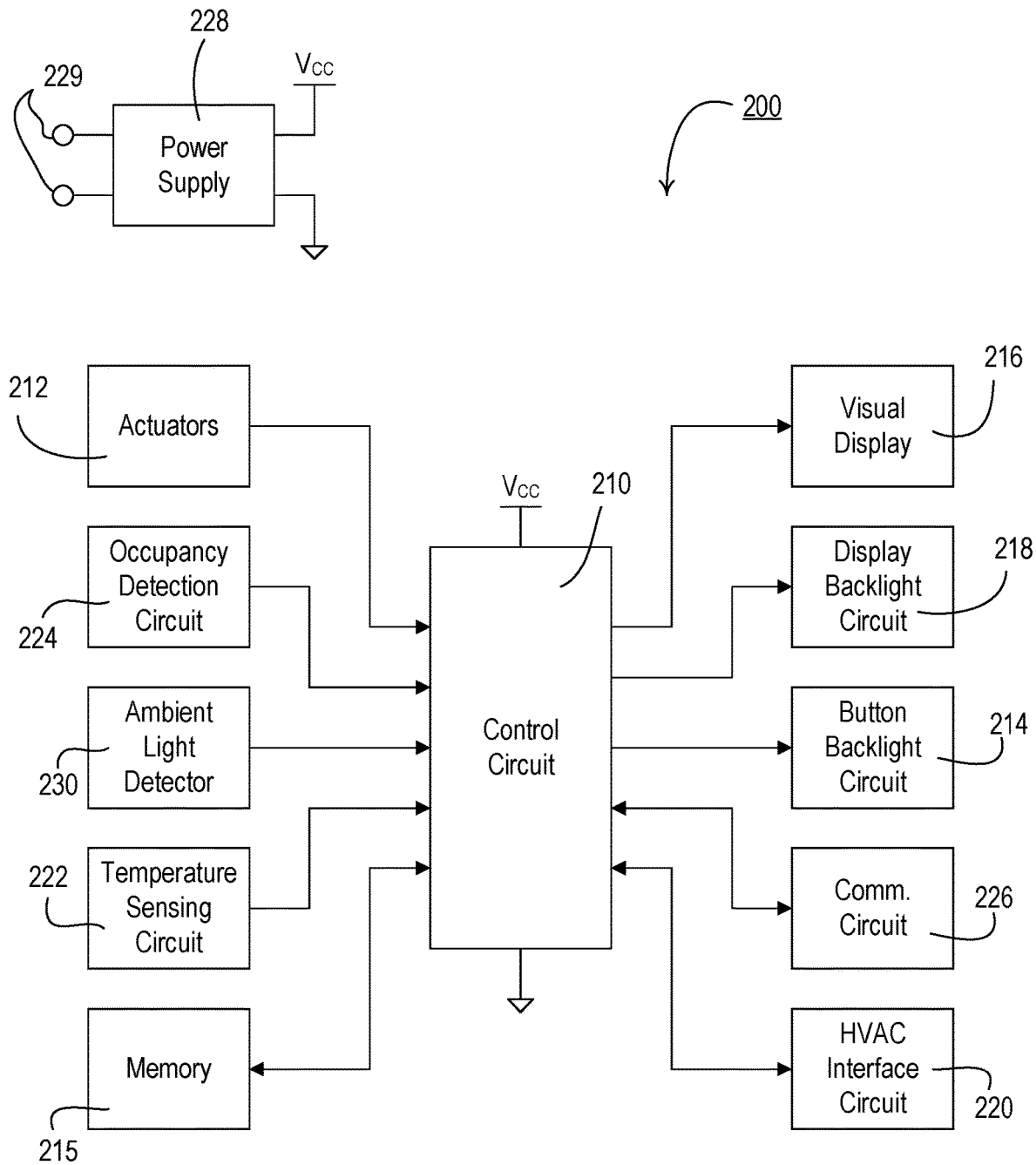
FIG. 2 is a block diagram of an example temperature control device.

FIG. 2 is a block diagram of an example temperature control device 200 that may be deployed as, for example, the thermostat 100 shown in FIG. 1. The temperature control device 200 may include a control circuit 210, which may include one or more of a processor(s) (e.g., a microprocessor), a microcontroller(s), a programmable logic device(s) (PLD), a field programmable gate array(s) (FPGA), an application specific integrated circuit(s) (ASIC), and/or any suitable processing device(s). The temperature control device 200 may include one or more actuators 212 (e.g., mechanical tactile switches), which may be actuated in response to actuations of the buttons 112-118, for example. The control circuit 210 may be coupled to the actuators 212 for receiving user inputs.

The temperature control device 200 may include a button backlight circuit 214 for illuminating indicia on one or more buttons (e.g., the buttons 112-118 of the thermostat 100). For example, the button backlight circuit 214 may include one or more LEDs located behind or to the side of each of the buttons (for description purposes only, temperature control device 200 will be described as using one or more LEDs to illuminate indicia on one or more buttons; nonetheless, other illumination mechanisms may be used). The control circuit 210 may be configured to control an LED current conducted through the LEDs of the button backlight circuit 214 to dim a surface illumination intensity of each button, e.g., by pulse-width modulating the LED current and adjusting a duty cycle $DC_{LED}$ of the pulse-width modulated LED current. The control circuit 210 may be configured to control the button backlight circuit 214 to illuminate the buttons to the awake surface illumination intensity $L_{SUR1}$ in the awake state and to the idle surface illumination intensity $L_{SUR2}$ in the idle state. The awake surface illumination intensity $L_{SUR1}$ may be brighter than the idle surface illumination intensity $L_{SUR2}$ To illuminate the buttons to the awake surface illumination intensity $L_{SUR1}$, the control circuit 210 may pulse-width modulate the LED current using a first LED duty cycle $DC_{LED1}$. To illuminate the buttons to the idle surface illumination intensity $L_{SUR2}$, the control circuit 210 may pulse-width modulate the LED current using a second LED duty cycle $DC_{LED2}$, which may be smaller than the first LED duty cycle $DC_{LED1}$.

The temperature control device 200 may include a memory 215 communicatively coupled to the control circuit 210. The control circuit 210 may be configured to use the memory 215 for the storage and/or retrieval of, for example, a setpoint temperature $T_{SET}$ and/or a present temperature $T_{PRES}$ in the space in which the temperature control device 200 is installed, and the awake surface illumination intensity $L_{SUR1}$, and/or to the idle surface illumination intensity $L_{SUR2}$ The memory 215 may also store one or more control applications (e.g., software based applications) that may be executed by the control circuit 210 to provide the functionality of the temperature control device 200 (and similarly the temperature control device 300 shown in FIG. 3, and the thermostat 100 shown in FIG. 1) as describe herein. The memory 215 may be implemented as an external integrated circuit (IC) or as an internal circuit of the control circuit 210.

The temperature control device 200 may include a visual display 216 (e.g., the visual display 110 of the thermostat 100) for displaying status information for a user, e.g., the present temperature $T_{PRES}$, the setpoint temperature $T_{SET}$, a mode of the HVAC system (e.g., heating or cooling), and/or a status of a fan of the HVAC system (e.g., on/off, and/or speed). For example, the control circuit 210 may be configured to update the present temperature $T_{PRES}$ displayed on the visual display 216 every 50 milliseconds. Visual display 216 may be, for example, an LCD screen or an LED screen (for description purposes only, visual display 216 will be described as an LED screen). The temperature control device 200 may also include a display backlight circuit 218 (e.g., having one or more LEDs) for illuminating the visual display 216 (for description purposes only, temperature control device 200 will be described as using one or more LEDs for illuminating the visual display 216; nonetheless, other illumination mechanisms may be used). The control circuit 210 may be configured to turn the display backlight circuit 218 on and off and/or adjust the intensity of the display backlight circuit.

The temperature control device 200 may include an HVAC interface circuit 220, which may be coupled to an HVAC system that controls the present temperature $T_{PRES}$ in the space. The HVAC interface circuit 220 may include a digital communication circuit for communicating with the HVAC system via a digital communication link, such as an Ethernet link, a BACnet® link, or a Modbus link. Alternatively and/or additionally, the HVAC interface circuit 220 may include an analog HVAC control circuit for controlling the HVAC system via a traditional analog control link, e.g., for turning the HVAC system on and off. The control circuit 210 may be configured to use the interface circuit 220 to control the HVAC system to adjust the present temperature $T_{PRES}$ in the space towards the setpoint temperature $T_{SET}$, to control a fan speed of the HVAC system, to turn the HVAC system on and off, to control a mode of the HVAC system (e.g., heating or cooling), etc. The control circuit 210 may be further configured to use the interface circuit 220 to receive messages from the HVAC system, such as status messages, etc. Other examples are possible.

The temperature control device 200 may include a temperature sensing circuit 222 for measuring the present temperature $T_{PRES}$ in the space in which the temperature control device 200 is installed. The temperature sensing circuit 222 may include a temperature sensor integrated circuit, for example, from the Si70xx family of temperature sensors manufactured by Silicon Labs. Other examples are possible. The temperature sensing circuit 222 may generate a temperature control signal $V_{TEMP}$, which may indicate the measured temperature in the space in which the temperature control device 200 is installed. The control circuit 210 may be configured to receive the temperature control signal $V_{TEMP}$, use the temperature control signal $V_{TEMP}$ to determine the present temperature $T_{PRES}$ in the space, and may store the present temperature $T_{PRES}$ in the memory 215. For example, the control circuit 210 may be configured to periodically sample the temperature control signal $V_{TEMP}$ and store the temperature sample in the memory 215 (e.g., every second). The control circuit 210 may be configured to average a predetermined number of temperature samples (e.g., the previous 16 temperature samples) stored in the memory 215 to determine the present temperature $T_{PRES}$, which may also be stored in the memory 215. The control circuit 210 may be configured to compare the present temperature $T_{PRES}$ to the setpoint temperature $T_{SET}$ and to control the HVAC system to adjust the present temperature $T_{PRES}$ in the space towards the setpoint temperature $T_{SET}$ if the present temperature $T_{PRES}$ is outside of a setpoint temperature range around the setpoint temperature $T_{SET}$ (e.g., +/−1° F.). Other variations are possible.

The temperature control device 200 may also include an occupancy detection circuit 224 for detecting an occupancy or vacancy condition in the vicinity of the temperature control device. The occupancy detection circuit 224 may include a detector, e.g., a pyroelectric infrared (PIR) detector, an ultrasonic detector, and/or a microwave detector, for example, for detecting an occupancy or vacancy condition in the space. For example, a PIR detector may be operable to receive infrared energy from an occupant in the space around the temperature control device 200 through a lens (e.g., the lens 120 of the thermostat 100 shown in FIG. 1) to thus sense the occupancy condition in the space. The control circuit 210 may be configured to determine a vacancy condition in the space after a timeout period expires since the last occupancy condition was detected. The control circuit 210 may be configured to turn the HVAC system on and off in response to the occupancy detection circuit 224 detecting occupancy and/or vacancy conditions.

The temperature control device 200 may further include a communication circuit 226, such as a wired communication circuit and/or a wireless communication circuit (e.g., an RF transmitter/receiver coupled to an antenna for transmitting RF signals) to communicate on a communication network with devices other than an HVAC system (e.g., to communicate via the Internet). The control circuit 210 may be coupled to the communication circuit 226 and may be configured to adjust the setpoint temperature $T_{SET}$ in response to digital messages, for example, received via the communication circuit 226. The control circuit 210 may also be configured to transmit the present temperature $T_{PRES}$ and/or the setpoint temperature $T_{SET}$ via digital messages via the communication circuit 226. One will recognize that control circuit 210 may transmit and/or receive other messages via communication circuit 226. When the communication circuit 226 includes a wireless communication circuit, it may include an RF receiver for receiving RF signals, an RF transmitter for transmitting RF signals, an RF transceiver for transmitting and receiving RF signals, an optical transmitter and/or receiver for transmitting and/or receiving optical messages, and/or an infrared (IR) transmitter and/or receiver for transmitting and/or receiving IR signals. One will recognize that communication circuit 226 may be configured to wirelessly communicate in other manners.

The temperature control device 200 may include a power supply 228 for generating a direct-current (DC) supply voltage $V_{CC}$ for powering the control circuit 210 and the other low-voltage circuitry of the temperature control device for example. The power supply 228 may be coupled to an alternating-current (AC) power source or an external DC power source via electrical connections 229. Alternatively or additionally, the temperature control device 200 may be configured to include an internal power source (e.g., one or more batteries) for supplying power to the power supply 228.

The temperature control device 200 may further include an ambient light detector 230 (e.g., an ambient light detection circuit) for measuring an ambient light level $L_{AMB}$ in the room in which the temperature control device 200 is installed. The ambient light detector 230 may generate an ambient light detect signal $V_{AMB}$, which may indicate the ambient light level $L_{AMB}$ and may be received by the control circuit 210. The control circuit 210 may be configured to adjust the awake and idle surface illumination intensities $L_{SUR1}$, $L_{SUR2}$ in response to the measured ambient light level $L_{AMB}$ as determined from ambient light detect signal $V_{AMB}$. For example, the control circuit 210 may be configured to increase the awake and idle surface illumination intensities $L_{SUR1}$, $L_{SUR2}$ if the ambient light level increases. The control circuit 210 may be configured to decrease the awake and idle surface illumination intensities $L_{SUR1}$, $L_{SUR2}$ if the ambient light level decreases.

The control circuit 210 may be configured to adjust the awake and idle surface illumination intensities $L_{SUR1}$, $L_{SUR2}$ by adjusting the duty cycle $DC_{LED}$ through each of the LEDs behind the respective buttons. For example, the control circuit 210 may be configured to adjust the first duty cycle $DC_{LED1}$ of the LED current conducted through the LEDs of the button backlight circuit 214 in response to the measured ambient light level $L_{AMB}$ according to an awake LED adjustment curve $DC_{AWAKE}$, and to adjust the second duty cycle $DC_{LED2}$ of the LED current conducted through the LEDs of the button backlight circuit 214 in response to the measured ambient light level $L_{AMB}$ according an idle LED adjustment curve $DC_{IDLE}$.

The heat generated by the LEDs of the button backlight circuit 214 may affect the temperature readings measured by the temperature sensing circuit 222, such that the temperature control signal $V_{TEMP}$ may not indicate the actual present temperature $T_{PRES}$ in the space in which the temperature control device 200 is installed. In addition, the heat generated by the visual display 216 and LEDs of the display backlight circuit 218 may also affect the temperature readings measured by the temperature sensing circuit 222. For example, since the awake surface illumination intensity $L_{SUR1}$ and the intensity of the display backlight circuit may be greater when the temperature control device 200 is in the active/awake state as compared to the inactive/idle state, the temperature control signal $V_{TEMP}$ may further deviate from the actual present temperature $T_{PRES}$ in the space when the temperature control device 200 is in the active state. For example, the heat generated by the button backlight circuit 214, the visual display 216, and the display backlight circuit 218 may cause the temperature inside of the temperature control device to be approximately 5° F. greater than the actual present temperature $T_{PRES}$ in the space when the temperature control device 200 is in the active/awake state.

Accordingly, the control circuit 210 may be configured to cease periodically sampling the temperature control signal $V_{TEMP}$ and storing the present temperature $T_{PRES}$ in the memory 215 when the temperature control device 200 is in the awake state. The control circuit 210 may be configured to use the last sampled temperature stored in the memory 215 as the present temperature $T_{PRES}$ during the awake state, where for example, the last sampled temperature stored in the memory 215 may have been sampled during the immediately preceding idle state. During the awake state, the control circuit 210 may be configured to continue to display the present temperature $T_{PRES}$ on the visual display 216. The control circuit 210 may also be configured to continue to compare the present temperature $T_{PRES}$ to the setpoint temperature $T_{SET}$ and may be configured to control the HVAC system if the present temperature $T_{PRES}$ is outside of the setpoint temperature range in the awake state (e.g., if the setpoint temperature $T_{SET}$ is adjusted while in the awake state).

The control circuit 210 may be further configured to wait for an idle time period $T_{IDLE-WAIT}$ after a last button press before changing from the awake state to the idle state. Once in the idle state, the control circuit 210 may once again sample the temperature control signal $V_{TEMP}$ to determine the present temperature $T_{PRES}$. For example, the idle time period $T_{IDLE-WAIT}$ may be long enough to allow the temperature inside of the temperature control device 200 to decrease to an idle steady state temperature that does not significantly affect the temperature readings measured by the temperature sensing circuit 222. The idle time period $T_{IDLE-WAIT}$ may be a predetermined amount of time (e.g., approximately 180 seconds) that is stored in the memory 215. Alternatively, the idle time period $T_{IDLE-WAIT}$ may be a function of the first duty cycle $DC_{LED1}$ used during the awake state (e.g., as determined from the awake adjustment curve $DC_{AWAKE}$) Other variations are possible.

When operating in the idle state, the control circuit 210 may be configured to control the button backlight circuit 214 to ensure that the heat generated by the LEDs of the button backlight circuit may not greatly affect the temperature readings measured by the temperature sensing circuit 222. For example, the control circuit 210 may limit the intensity to which each of the LEDs of the button backlight circuit 214 are controlled during the idle state. In addition, the control circuit 210 may turn off the LEDs of the button backlight circuit 214 when the ambient light level $L_{AMB}$ exceeds an ambient light threshold $L_{TH}$ (e.g., approximately 200 Lux) above which the indicia on the buttons may be easily distinguished by as user.

The temperature control device 200 may be configured to measure and/or control other parameters of the space around the temperature control device. For example, the temperature control device may include a humidity sensing circuit (e.g., including a humidity sensing integrated circuit) that may be configured to measure a relative humidity level of the surround space. The temperature control device 200 may be configured to adjust the relative humidity level based on the measurement. The humidity sensing circuit may be configured to measure the present temperature $T_{PRES}$ in the space. The measured present temperature $T_{PRES}$ may be used by the temperature control device 200 to determine the relative humidity in the space. In addition and/or alternatively, the temperature sensing circuit 222 may be configured as a temperature and humidity sensing circuit. As similarly described above, the heat generated by the LEDs of the button backlight circuit 214, the visual display 216, and/or the LEDs of the display backlight circuit 218 may affect the relative humidity readings output by the humidity sensing circuit. Accordingly, the techniques described herein for mitigating the impact of the heat (and thus the deviation of the readings from the actual parameters) may be applied to the measurement and/or control of the relative humidity level. For example, a last sampled relative humidity level (e.g., sampled during the immediately preceding idle state) may be stored in the memory 215 and used during the awake state. Temperature control device 200 is one example and other examples are possible.

Figure 3:
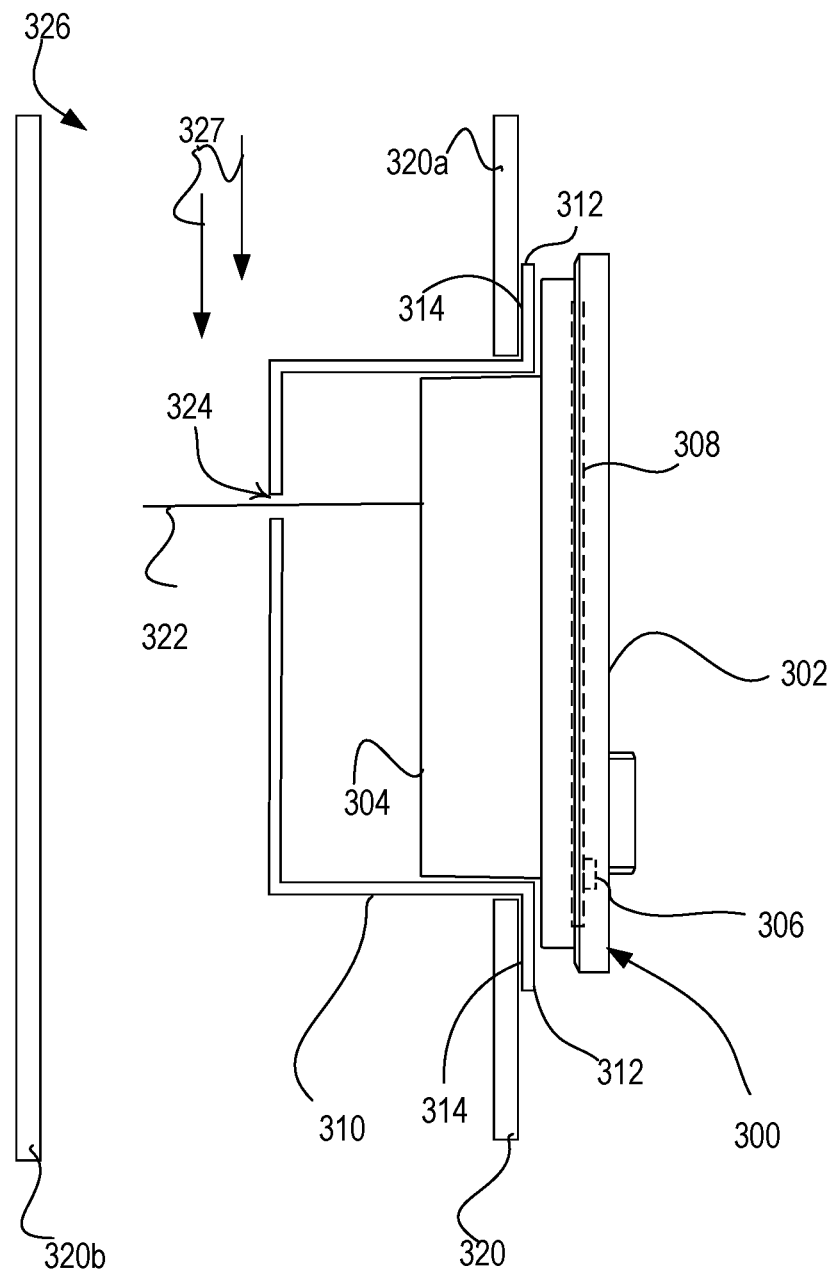
FIG. 3 illustrates a side cross-section view of an example temperature control device mounted to an electrical wall box.

Turning now to FIG. 3 there is shown a side cross-section view of an example temperature control device 300 mounted to a typical example electrical wall box 310. The electrical wall box 310 may include one or more flanges or tabs 312 having rear surfaces 314 that may abut a vertical surface (e.g., the outer vertical surface of a wall 320a) to which the electrical wall box may be mounted. The temperature control device 300 may be a wall-mounted thermostat (e.g., such as the wall-mounted thermostat 100 shown in FIG. 1 and/or the temperature control device 200 shown in FIG. 2 although other examples are possible). The temperature control device 300 may define a front portion 302 and a rear portion 304. The front portion 302 may include a user interface and/or display of the temperature control device 300 (e.g., similar to the visual display 110 and buttons 112-118 of thermostat 100, or the visual display 216 of temperature control device 200). The rear portion 304 may include one or more sensors and/or circuits configured to operate the temperature control device 300 (e.g., as similarly described for thermostat 100 and/or temperature control device 200). The temperature control device 300 may also include a temperature sensor 306 mounted to a printed circuit board 308 (shown by dashed lines in FIG. 3) that is located inside of the temperature control device 300. The printed circuit board 308 and the temperature sensor 306 may be located between the front portion 302 and the rear portion 304. The temperature sensor 306 may be used to determine (e.g., measure or calculate) a present temperature $T_{PRES}$ in the room in which the temperature control device 300 is installed. For example, the temperature sensor may measure $T_{PRES}$. The rear portion 304 may extend into an interior of the electrical wall box 310 when the temperature control device 300 is mounted to the electrical wall box 310. In some examples, the temperature sensor 306 may be located within the electrical wall box 310 when the temperature control device 300 is mounted to the electrical wall box 310.

The electrical wall box 310 may include one or more apertures 324 (e.g., such as holes, cracks, unsealed joints, clamping tabs, punch-outs, etc.), one or more of which may be configured to receive one or more electrical cables or electrical wires (represented as line 322) to interface with the temperature control device 300. For purposes of description, a wire may be a single conductor or may be multiple conductors that have no separating insulation (e.g., twisted wires). A cable may be two or more insulated wires wrapped in a single jacket or sheath. As one example, two separate/individual wires may interface temperature control device 300 to provide power to the device (e.g., power wires to interface with a power supply, such as power supply 228). These two wires may be wrapped in a single jacket/sheath to form one cable. As another example, two separate/individual wires may interface temperature control device 300 for the device to communicate with an HVAC system (e.g., HVAC wires to interface with an HVAC interface circuit, such as HVAC interface circuit 220). These two wires may be wrapped in a single jacket/sheath to form one cable. As another example, two separate/individual wires may interface the temperature control device 300 to provide power to the device and two separate/individual wires may interface the temperature control device 300 for the device to communicate with an HVAC system. These four wires may be wrapped in a single jacket/sheath to form one cable. One will recognize that other variations are possible, including, for example, one or more separate/individual wires (possibly wrapped a single jacket/sheath) for interfacing with a communication circuit (such as a communication circuit 226) of temperature control device 300.

According to one specific example, a cable having two 18 AGW (American Wire Gauge) wires, two 22 AWG wires, and one 24 AWG may be used to interface with device 300 (not all of these wires may be used to interface the device). Depending on the type of sheath used for the cable (e.g., plenum sheath, PVC sheath), the cable may have, for example, a diameter of 0.17 inches (or approximately 0.17 inches) (e.g., if a plenum sheath is used), or a diameter of 0.21 inches (or approximately 0.21 inches) (e.g., if a PVC sheath is used). As another example, a cable having two 12 AGW wires, one 18AWG wire, two 22 AWG wires, and one 24 AWG may be used to interface with device 300 (not all of these wires may be used to interface the device). Depending on the type of sheath used for the cable (e.g., plenum sheath, PVC sheath), the cable may have, for example, a diameter of 0.30 inches (or approximately 0.30 inches) (e.g., if a plenum sheath is used), or a diameter of 0.325 inches (or approximately 0.325 inches) (e.g., if a PVC sheath is used). Other types of wires and/or cables may be used. Hence, electrical wires or cables (such as wire/cable 322) have varying thicknesses/diameters (e.g., in the range of 0.16 inches to 0.325 inches, or in the approximate range of 0.16 inches to 0.325 inches) may be used to interface with device 300.

Turning again to FIG. 3, in some buildings, homes, etc., the air return (represented by arrows 327) of the HVAC system may flow through the wall cavities (e.g., shown as space 326 between two walls 320a and 320b) of the building (e.g., behind the drywall without using ducts). As a result, the air within a wall cavity may be a different temperature than the air within the room. In addition, the air within the wall cavity may be moving at a substantially high airflow rate. Since the temperature sensor 306 may be located within the temperature control device 300, which may be mounted to the electrical wall box 310, the air within the wall cavity may affect the temperature readings (e.g., the measurement of the present temperatures $T_{PRES}$) measured by the temperature sensor 306.

In particular, a typical electrical wall box (e.g., such as the electrical wall box 310) is not airtight because of the apertures therein, including the apertures 324 used to pass one or more wires and/or cables 322 from the wall cavity into the wall box and to the temperature control device 300. These apertures may allow air to pass from the wall cavity and into the interior of the electrical wall box 310 (and to possibly flow back out). Airflow (e.g., such as return airflow) within the wall cavity may adversely influence the temperature measurements of a temperature sensor 306 located within the temperature control device 300 and/or electrical wall box 310. When the temperature control device 300 is installed in the electrical wall box 310 and the air return of the HVAC system flows through the wall cavities, air may flow in and/or out of the interior of the electrical wall box 310, through the temperature control device 300, and past the temperature sensor 306, which may cause the measurements of the present temperature $T_{PRES}$ to fluctuate. The measurement of the present temperature $T_{PRES}$ determined by the temperature sensor 306 thus may be influenced by the airflow through the temperature control device 300 and may not indicate the actual present temperature $T_{PRES}$ in the room. As a result, the temperature control device 300 may send unnecessary and/or inaccurate HVAC control signals to the HVAC system, for example, due to fluctuating temperature measurements.

Figure 4A:
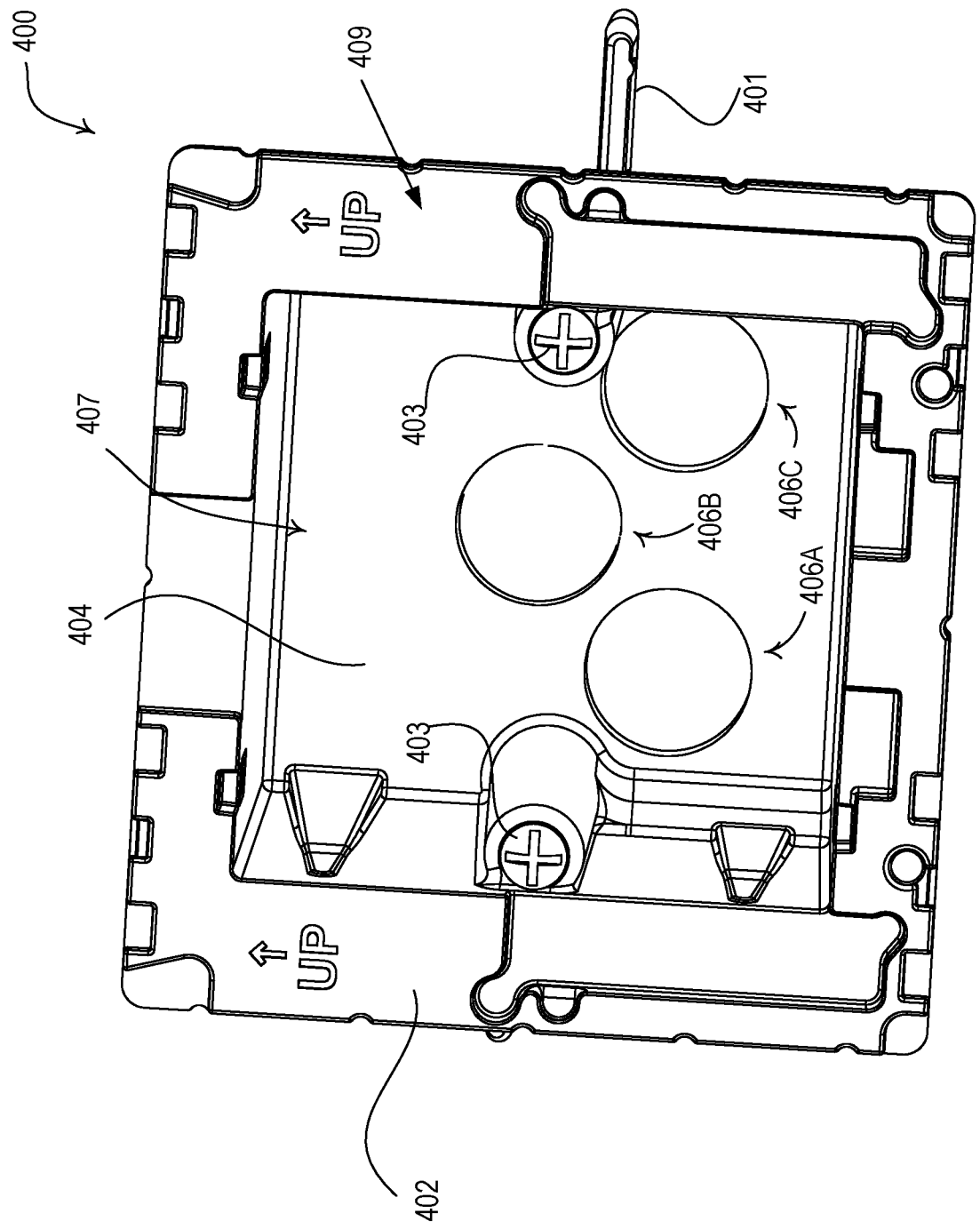
FIG. 4A is a front perspective view of an example sealed electrical wall box having holes therein.
Figure 4B:
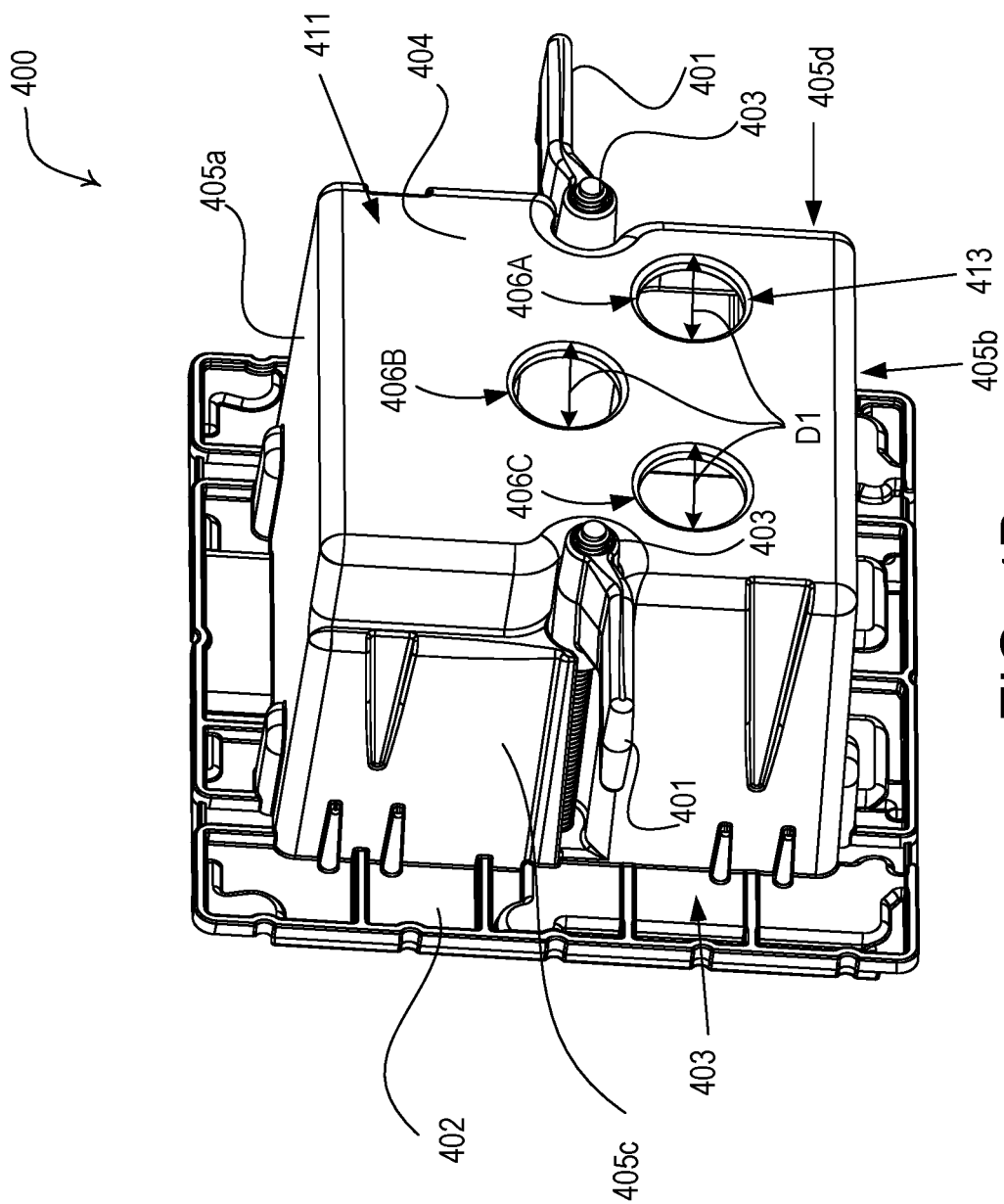
FIG. 4B is a rear perspective view of the example sealed electrical wall box shown in FIG. 4A.

Turning now to FIGS. 4A and 4B, there is shown an example sealed electrical wall box 400 that may be used to resolve/address the above noted problem. FIG. 4A is a front perspective view of the sealed electrical wall box 400 showing a front side 409 of the wall box and FIG. 4B is a rear perspective view of the sealed electrical wall box 400 showing a back or rear side 411 of the wall box. The sealed electrical wall box 400 may be made of molded plastic or metal, although other materials may be used. The sealed electrical wall box 400 may be a flush-mounted wall box. A flush-mounted wall box may be true to an outer surface of a wall. For example, the sealed electrical wall box 400 may be configured such that a flange 402 that is integral with the body of the sealed electrical wall box 400 contacts and is substantially level with the outer surface of the wall when the wall box is installed. The sealed electrical wall box 400 may be configured to receive through opening 407 at the front side 409 of the wall box one or more electrical devices (e.g., such as the temperature control device 300 shown in FIG. 3, the temperature control device 200 shown in FIG. 2, and/or the thermostat 100 shown in FIG. 1, although other devices are possible). The sealed electrical wall box 400 may be configured to prevent air within a wall cavity of the wall from entering the interior of the sealed electrical wall box 400 and influencing a temperature measurement made within the sealed electrical wall box, for example, by a temperature sensor 306.

Referring further to flange 402, the flange may be configured to engage an outer surface of a wall. For example, a backside 403 of the flange 402 may be substantially flush with the outer surface of the wall when the wall box is installed in the wall. As shown in FIGS. 4A and 4B the flange 402 may extend along all sides of the wall box. Nonetheless, the flange 402 may only extend along a portion of one or more sides of the wall box. For example, the flange 402 may extend along sufficient portions of one or more sides of the wall box such that when the wall box is installed in an opening of a wall, the flange prevents the wall box from passing through the opening. Wall box 400 may also include one or more retractable wings 401 and one or more screws 403 that extend through the body of the wall box and through the wings. Once the wall box is inserted into an opening of a wall, the actuation/turning of screws 403 may cause the wings to move towards and engage the inner/back surface of a wall, thereby securing the wall box to the wall by "pinching" the wall between the wings 401 and flange 402. Similarly, the actuation/turning of screws 403 in an opposite direction may cause wings 401 to move away from and disengage the inner/back surface of the wall. One will recognize that wall box 400 may be secured to a wall in manners other than wings 401 and/or flange 402. One will also recognize that wall box 400 may take forms other than a flush-mounted box. For example, wall box 400 may be configured to be secured directly to a stud, in which case the wall box may not include wings 401, for example. Other variations are possible.

The sealed electrical wall box 400 may define a back plate 404 that resides within the wall cavity when the wall box is installed in a wall. The back plate 404 may be distal from the flange 402. The back plate may be substantially parallel to the flange 402. The back plate 404 may define the depth of the sealed electrical wall box 400. The back plate 404 may include or define one or more holes or openings or apertures therethrough (e.g., three holes being shown in this example, including holes 406A, 406B, and 406C, although fewer or additional holes may be defined). The holes 406A, 406B, and 406C may be configured to allow electrical cables and/or electrical wires (e.g., cable/wire 322) to enter the sealed electrical wall box 400 from the wall cavity as further described herein. Each of the holes 406A, 406B, and 406C may have a diameter D1. As an example, D1 may be 12.5 millimeters (or approximately 12.5 mm). One will recognize that other diameters and tolerances are possible. Holes 406A, 406B, 406C may be formed or molded into the wall box 400. Alternatively, wall box 400 may be configured such that one or more of the holes 406A, 406B, and 406C are covered (e.g., molded over) where the covering may be configured to be "punched-out" thereby revealing the respective hole. Wall box 400 may be configured such that when a hole is covered/molded over, no air may pass through the hole from the wall cavity until the covering is punched-out. Wall box 400 may also define a top plate 405a, a bottom plate 405b (not shown in FIGS. 4A and 4B), a first side plate 405c, and a second side plate 405d (not shown in FIGS. 4A and 4B). The plates 405a, 405b, 405c, and 405d may not include any openings or holes. Alternatively, in addition to holes 406A, 406B, and 406C on back plate 404, one or more of plates 405a, 405b, 405c, and 405d may each include one or more holes similar to holes 406A, 406B, and 406C, which may be covered/molded over and which may be further configured to be "punched-out" thereby revealing a respective hole. Similarly, although the holes 406A, 406B, and 406C are shown located on the back plate 404 of the wall box, the sealed electrical wall box 400 may not include any holes on the back plate 404 and may only include one or more holes on one or more plates 405a, 405b, 405c, and 405d. One will also recognize that while holes 406A, 406B, and 406C are shown as being circular in shape, the holes may have other shapes, such as oval, square, rectangular, etc. One will further recognize that while wall box 400 is shown as having a square or cube like shape, the wall box may have other shapes such as a circular or tube like shape, a triangular like shape, an oval type shape, etc.

The sealed electrical wall box 400 may be further configured such that other than opening 407 at the front side 409 of the wall box, the only other apertures through which air may enter the interior of the wall box may be holes 406A, 406B, and 406C. As further described below, respective glands or grommets may be inserted into the holes 406A, 406B, and 406C of the wall box 400 and wires and/or cables 322 may then be inserted through the glands/grommets from the wall cavity and into the interior of the wall box and connected to a temperature control device (such as the temperature control device 300 shown in FIG. 3, the temperature control device 200 shown in FIG. 2, and/or the thermostat 100 shown in FIG. 1). In this fashion, wall box 400 in connection with the glands and/or grommets may prevent or substantially hinder air within a wall cavity of the wall from entering the sealed electrical wall box, even when wires and/or cables are inserted into the wall box through the glands or grommets. For example, together with the glands and/or grommets described herein, the sealed electrical wall box 400 may be configured to provide an airtight or substantially airtight seal between the wall cavity and an interior of the sealed electrical wall box 400. For example, the sealed electrical wall box 400 may prevent air (and also water, dirt, and/or dust for example) from passing between the wall cavity and into the sealed electrical wall box 400 through the back plate 404, for example, of the wall box. In this fashion, the air return of an HVAC system flowing through a wall cavity may be prevented or hindered from flowing into the interior of the electrical wall box 400, into/through the temperature control device 300, and past the temperature sensor 306 and thus affecting the measurements of the present temperature $T_{PRES}$. Hence, as described herein, the sealed electrical wall box 400 together with the glands/grommets may be airtight and/or substantially/sufficiently airtight to prevent air that may be flowing through a wall cavity from adversely affecting the measurements of the present temperature $T_{PRES}$ made by a temperature sensor 306.

According to one example, a watertight gland and/or grommet may be inserted into each of holes 406A, 406B, and 406C of wall box 400 (assuming the holes are not molded over and/or are punched-out. For example, a gland/grommet manufactured by Jacobs having a part number G502-1012-02 (hereafter referred to as the "Jacobs grommet" or "Jacobs gland") may be inserted into each of holes 406A, 406B, and 406C of the electrical wall box 400. Watertight glands/grommets like the Jacobs grommet, once inserted, may prevent/hinder airflow from a wall cavity from entering into the wall box 400 and adversely influencing the temperature measurements of the temperature sensor 306. A watertight gland/grommet like the Jacobs grommet may also include an opening therein through which may be inserted an electrical wire and/or electrical cable (e.g., wire and/or cable 322) intended to interface with the temperature control device, such as device 300. A watertight gland/grommet like the Jacobs grommet may be further configured to seal gaps between a wire or cable inserted through the opening of the gland/grommet and into the electrical wall box, thereby preventing air within a wall cavity from entering into the wall box and adversely influencing the temperature measurements of the temperature sensor.

While a watertight gland/grommet like the Jacobs grommet may be used with the wall box 400, such glands/grommets have several shortcomings. For example, openings in existing watertight glands and/or grommets may be configured to accept wires or cables having limited thicknesses. The openings in existing watertight glands and/or grommets may not easily accept a wire or cable having thicknesses in the ranges (e.g., 0.17 to 0.325 inches) required for a temperature control device, such as a device 300. For example, a watertight gland/grommet like the Jacobs grommet may be made of EPDM rubber (ethylene propylene diene monomer rubber) and may not easily stretch or deform when a wire or cable is inserted into the opening of the gland/grommet. For example, a watertight gland/grommet may have a dynamic to static stiffness ratio in a range of approximately 4:1 (4 to 1) to 5:1 (5 to 1). In addition, the opening in existing watertight glands/grommets like the Jacobs grommet may be configured as an extended channel that extends along a length of the gland and/or grommet. As a result, when existing watertight glands and/or grommets are used with wall box 400 and with a temperature control device like device 300, for example, it has been found that as a wire or cable is pulled from the wall cavity and is inserted through the opening in the gland/grommet and into the interior of the wall box, the wire or cable may experience a high degree of resistance from the gland/grommet both because the opening in the gland/grommet is somewhat non-elastic and because the wire or cable may contact the sides of the opening at multiple points along the extended channel that extends along a length of the gland and/or grommet. As a result, the gland/grommet may be displaced from the hole 406A, 406B, or 406C of the electrical wall box 400 as the wire or cable is inserted into the opening in the gland/grommet. In addition, during installation, a wire or cable may be partially pushed back out through the gland/grommet and into the wall cavity to adjust the wire's or cable's length within the wall box. This reverse pushing may also cause the gland and/or grommet to be displaced from the hole 406A, 406B, or 406C of the electrical wall box 400. Regardless, once a watertight gland/grommet is displaced from the wall box, it may be difficult to re-insert the gland/grommet into the hole of the wall box both because the wall box be may be affixed to the wall and because the glands/grommets can be difficult to install in general because they are made of somewhat in-elastic material. When a gland and/or grommet is displaced from the electrical wall box, the airtight seal between the gland/grommet and the electrical wall box 400 may be compromised and may adversely influence the temperature measurements as described herein.

As an alternative to using watertight glands/grommets (e.g., such as the Jacobs grommet), according to another example glands/grommets that may include a star-shaped wire opening may be installed within the holes 406A, 406B, and 406C of the sealed wall box 400. Examples of such glands/grommets is a grommet manufactured by Kinglok having a part number PSGR-1316 (hereafter "Kinglok grommet") and a grommet manufactured by McMaster having a part number 4946A1 (hereafter "McMaster grommet"). As an example, these glands/grommets may be made of hard plastics/polymers. Once such a gland/grommet is installed in a hole 406A, 406B, and 406C of the sealed wall box 400, an electrical wire and/or electrical cable (e.g., wire and/or cable 322) intended to interface with the temperature control device, such as device 300, may be inserted through the star-shaped wire opening and into the wall box. Advantageously, the star-shaped wire openings in these glands/grommets may flex more easily than the openings in watertight glands/grommets such that wires or cables having different thicknesses may be received therethrough. Accordingly, these glands/grommets may more readily stay affixed within the openings in the wall box 400 as wires and/or cables are inserted into the wall box. However, these glands/grommets may not be watertight and the star-shaped wire openings may not provide an airtight seal around the wires and/or cables once inserted through the openings. Accordingly, these glands/grommets may not prevent airflow from adversely influencing the temperature measurements of the temperature sensor. For example, the star-shaped wire openings of the Kinglok grommet and the McMaster grommet may allow too much airflow from within the wall cavity to enter the electrical wall box 310.

Figure 5A:
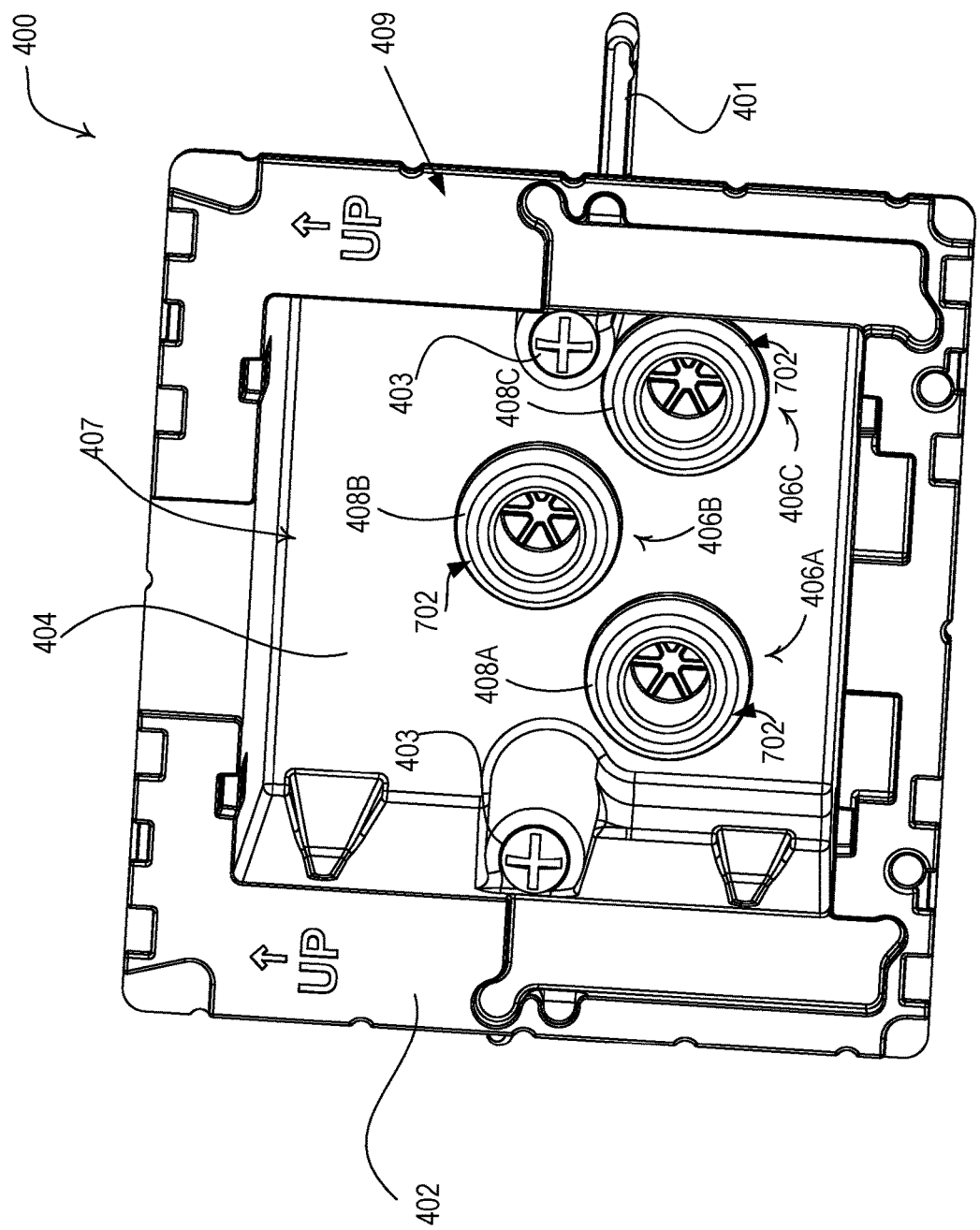
FIG. 5A is a front perspective view of the example sealed electrical wall box shown in FIG. 4A with gland seals position in the holes of the wall box.
Figure 5B:
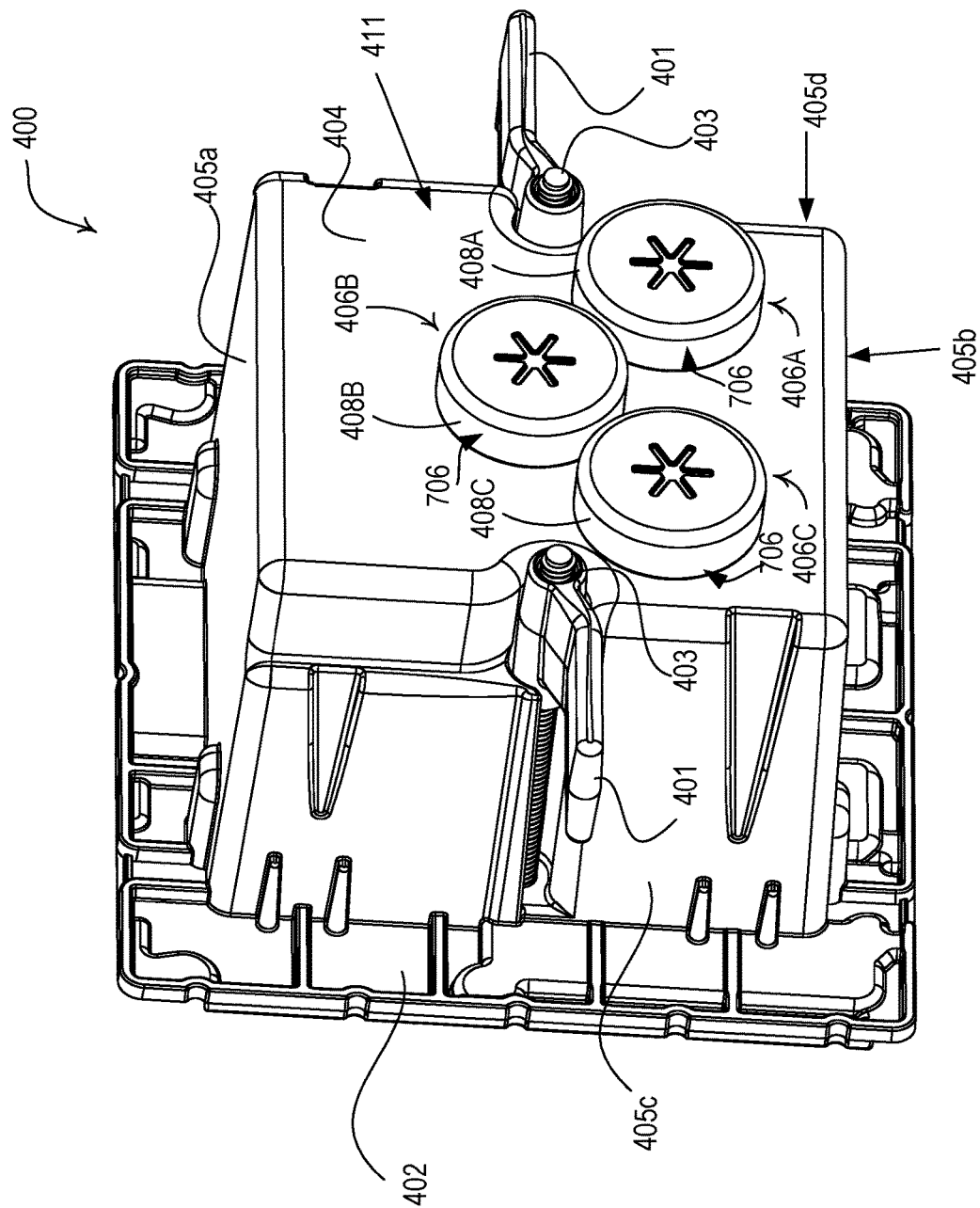
FIG. 5B is a rear perspective view of the example sealed electrical wall box shown in FIG. 5A with gland seals positioned in the holes of the wall box.
Figure 5C:
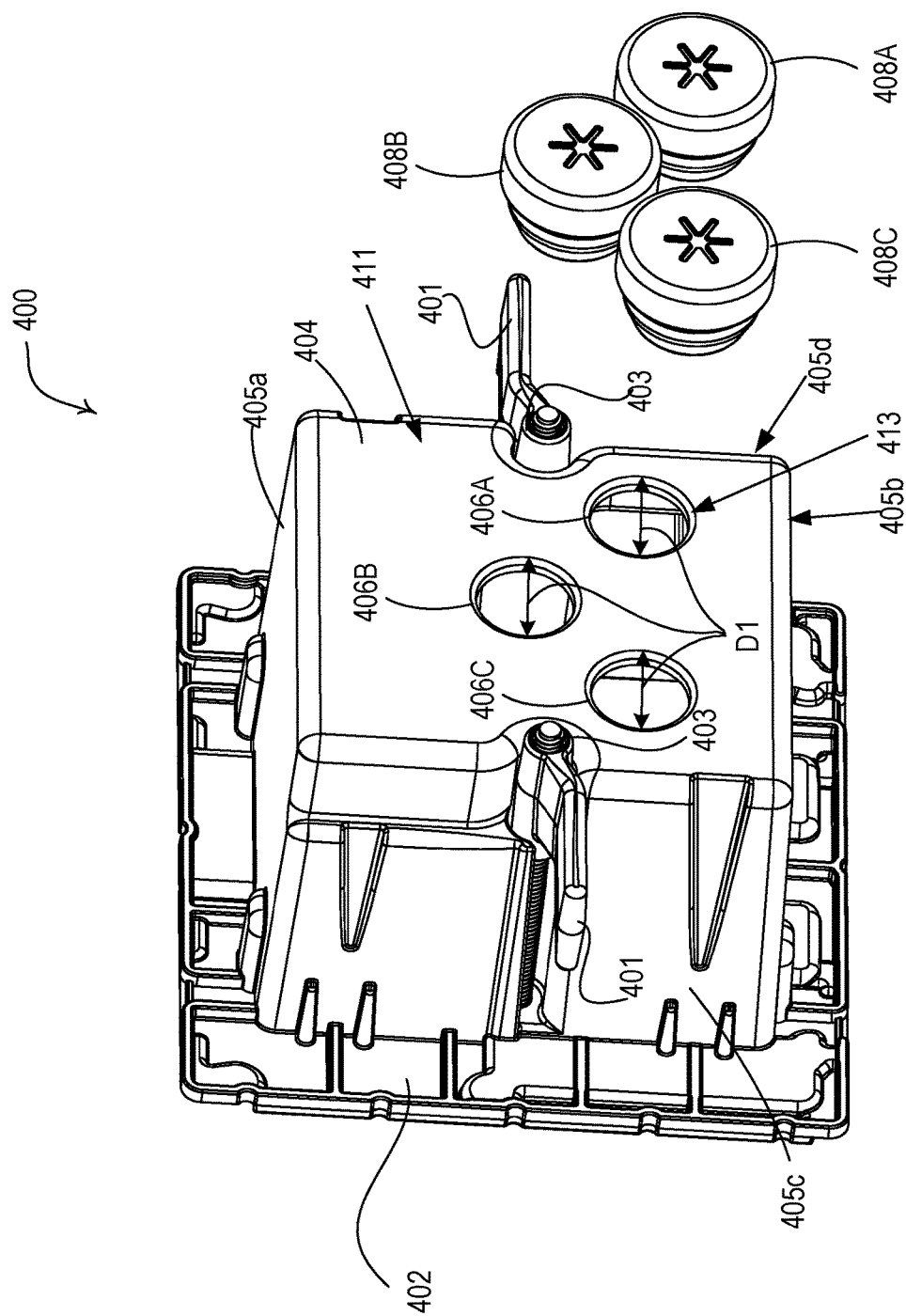
FIG. 5C is a partially exploded view of the example sealed electrical wall box shown in FIG. 5B.

Referring now to FIGS. 5A, 5B, and 5C, there is shown example sealed electrical wall box 400 with example glands or gland seals (either term may be used interchangeably herein) 408A, 408B, and 408C. FIG. 5A is a front perspective view of the sealed electrical wall box 400 with gland seals 408A, 408B, and 408C installed/inserted within holes 406A, 406B, and 406C. FIG. 5B is a rear perspective view of the sealed electrical wall box 400 with gland seals 408A, 408B, and 408C installed/inserted within holes 406A, 406B, and 406C. FIG. 5C is a partially exploded view of the sealed electrical wall box 400 with gland seals 408A, 408B, and 408C removed from holes 406A, 406B, and 406C. As shown, the gland seals 408A, 408B, and 408C may be configured to be installed/inserted within holes 406A, 406B, 406C from the back side 411 of the wall box, for example. Each of the gland seals 408A, 408B, 408C may be further configured to be removably secured within a respective hole. For example, the gland seals 408A, 408B, and 408C may be configured to remain installed within the respective holes (e.g., without fasteners, glue, etc.) unless manipulated such that the shape is deformed and forced out of place. As shown, gland seal 408A may be configured to be removably secured within hole 406A, gland seal 408B may be configured to be removably secured within hole 406B, and gland seal 408C may be configured to be removably secured within hole 406C.

Each of the gland seals 408A, 408B, and 408C may be configured to receive an electrical cable and/or an electrical wire having various thicknesses, and/or may be configured to receive multiple electrical cables and/or electrical wires having various thicknesses. For example, as further described below the gland seals 408A, 408B, and 408C may allow the electrical cables and/or wires to enter the sealed electrical wall box 400 from the wall cavity. The gland seals 408A, 408B, and 408C may be configured to prevent/hinder or substantially hinder air from the wall cavity to flow into the sealed electrical wall box 400 via the holes 406A, 406B, and 406C. The gland seals 408A, 408B, and 408C may be further configured to provide a substantially airtight seal between the sealed electrical wall box 400 and the wall cavity when one or more electrical cables and/or wires enter the sealed electrical wall box 400 from the wall cavity through the glands.

Again, one will readily understand that although the sealed electrical wall box 400 is shown in FIGS. 5A, 5B, and 5C as having three holes 406A, 406B, and 406C and three glands 408A, 408B, and 408C, the sealed electrical wall box 400 may include more or less holes and glands. One or more of the holes 406A, 406B, and 406C may not be needed to receive a cable or wire. In this case, a gland such as any of glands 408A, 408B, and 408C may be inserted into the hole(s) and not used. Alternatively, one or more plugs (such as airtight plugs and/or watertight grommets such as the Jacobs grommet) may be installed within one or more of the holes 406A, 406B, and 406C that are not being used. The plugs may be configured to prevent air within the wall cavity of the wall from entering the sealed electrical wall box 400 and/or influencing a temperature measurement made within the sealed electrical wall box 400. Also, as discussed above, one or more holes 406A, 406B, and 406C of wall box 400 may be configured/molded to have punch-outs that when not removed, provide an airtight covering over the hole and that may thereafter be removed to receive a gland such as glands 408A, 408B, and 408C. Although the holes 406A, 406B, and 406C and the gland seals 408A, 408B, and 408C are shown as being circular, the sealed electrical wall box 400 may have holes of any shape therethrough and the gland seals may be configured in any shape to correspond to the holes of the sealed electrical wall box 400.

Figure 6A:
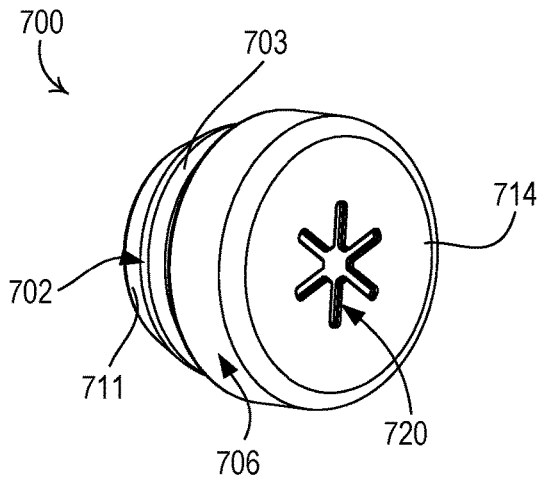
FIGS. 6A, 6B, 6C, 6D, and 6E illustrate different views of an example gland seal.
Figure 6B:
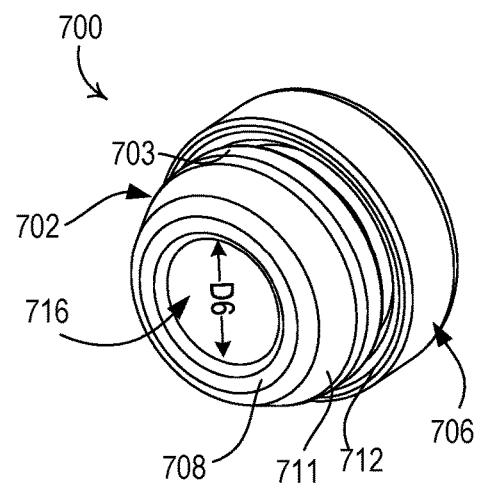
Figure 6C:
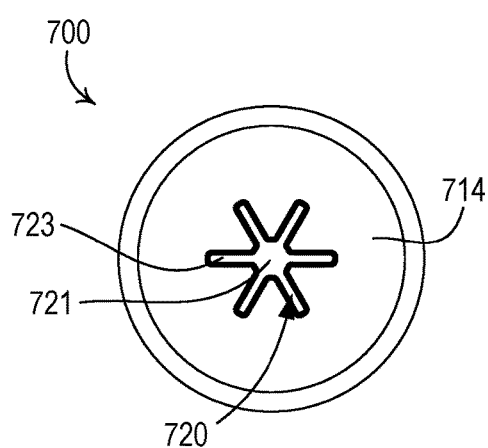
Figure 6D:
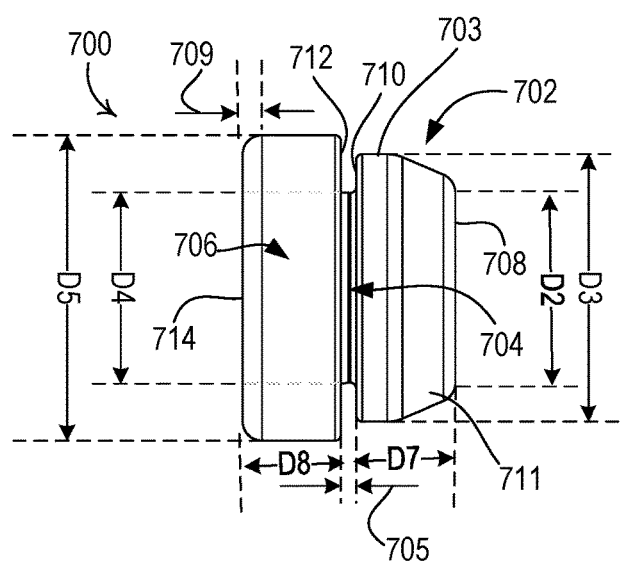
Figure 6E:
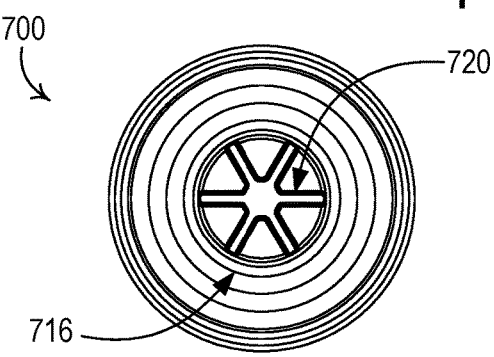

Referring now to FIGS. 6A, 6B, 6C, 6D, and 6E there is shown an example gland/gland seal 700 (e.g., any of gland seals 408A, 408B, 408C shown in FIGS. 5A, 5B, and 5C may resemble gland seal 700). FIG. 6C shows a rear view of the gland seal (e.g., as if viewing the gland seal as shown in FIG. 5B), FIG. 6E shows a front view of the gland seal (e.g., as if viewing the gland seal as shown in FIG. 5A), FIG. 6A shows a rear perspective view of the gland seal, FIG. 6B shows a front perspective view of the gland seal, and FIG. 6D shows a side view of the gland seal. The gland seal 700 may be configured to be installed within a hole of a sealed electrical wall box (e.g., such as sealed electrical wall box 400 shown in FIGS. 4A and 4B, and FIGS. 5A, 5B, and 5C). The gland seal 700 may be made from an elastic material, for example, such as a flexible rubber-like material, an elastomeric material, and/or the like. For example, the gland seal may be a type of silicone. According to one example, gland seal 700 may have a dynamic to static stiffness ratio of approximately 2:1 (2 to 1). In this fashion, the gland seal may be both easy to deform and therefore easy to insert into the holes 406A, 406B, and 406C of the wall box 400, and may also maintain its shape once inserted, thereby staying affixed to the holes 406A, 406B, and 406C once inserted. One will recognize that gland seal 700 may be made of other materials that have different dynamic to static stiffness ratios. The gland seal 700 may define a front portion 702, an intermediate portion 704, and a rear portion 706 where the intermediate portion is situated between the front and rear portions and interconnects the front and rear portions (use of the terms front portion, intermediate portion, and rear portion are used herein for description purposes only. These portions may also be referred to as first, second, and third portions or segments, etc. also, again, for description purposes only). The front portion 702 may be configured to be located within the interior of the electrical wall box when the gland seal 700 is installed (as shown in FIG. 5A). The rear portion 706 may be configured to be located outside of or on the rear side 411 of the electrical wall box when the gland seal 700 is installed (as shown in FIG. 5B). The intermediate portion 704 may be configured to sit within the holes 406A, 406B, and 406C of the wall box 400 when the gland seal 700 is installed. As shown in FIGS. 6A, 6B, 6C, 6D, and 6E, each of front portion 702, intermediate portion 704, and rear portion 706 of gland 700 may have a similar circular type shape. According to another example, the various portions may have different shapes. For example, the intermediate portion 704 may have a shape similar to the shape of holes 406A, 406B, and 406C of the wall box 400 to thereby form an airtight seal (e.g., a circular type shape). The front portion 702 and the rear portion 706, however, may each have a different shape than the intermediate portion 704, such as a square or oval type shape. Other examples are possible.

Turning to the front portion 702, as noted it may be configured to be located within an interior of the electrical wall box when the gland seal 700 is installed into the wall box (e.g., as shown in FIG. 5A). Front portion 702 may be tapered from a front surface 708 towards an opposing intermediate surface 710 thereby forming a tapered region 711 (use of the terms front and intermediate surfaces and tapered region are used herein for description purposes only. Front and intermediate surfaces may also be referred to as first and second surfaces, for example, again, for description purposes only). For example, the front surface 708 may have a diameter D2 and the intermediate surface 710 may have a diameter D3, with diameter D2 being less than diameter D3. The diameter D2 may also be less than the diameter of the holes of the electrical wall box 400 (e.g., the diameter D1 shown in FIGS. 4B and 5C), and diameter D3 may be greater than the diameter of the holes of the electrical wall box such that the gland seal 700 is configured to be pressed into a respective hole. As an example, D3 may be 0.692 inches (or approximately 0.692 inches, such as 0.692 inches+/−0.005 inches). One will recognize that other diameters are possible including for example, diameter D2 being less than diameter D3 but greater than diameter D1. As shown in FIG. 6D for example, the tapering from the front surface 708 to the intermediate surface 710 (i.e., the tapered region 411) may not be continuous, with the tapering stopping at a flat ridge region 703 that may form and terminate at intermediate surface 710 and may thus interface with intermediate portion 704 (i.e., the tapered region 711 may have a cone type shape, and the flat ridge region 703 may have a cylinder/cylindrical type shape) (use of the term flat ridge region is used herein for description purposes only. Tapered region and flat ridge region may also be referred to as first and second regions, for example, again, for description purposes only). Hence, a surface of the tapered region 711 may be configured at an angle (other than 0 and 90 degrees) to front surface 708 and the intermediate surface 710. A surface of the flat ridge region 703 may be configured at or about a 90 degree angle, for example, to each of the front surface 708 and the intermediate surface 710. The intermediate surface 710 may be configured to rest against/contact an interior surface of a back plate on an interior of the electrical wall box (e.g., such as an interior surface of back plate 404 as shown in FIG. 5A) when the gland seal 700 is installed. Front portion 702 may have a length D7 of 0.255 inches (or approximately 0.255 inches, such as 0.255+/−0.005 inches). One will recognize that other diameters are possible.

The front portion 702 may be configured to be deformed (e.g., as discussed above with respect to stiffness ratio) such that the gland seal 700 may be installed within a hole 406A, 406B, or 406C of the electrical wall box. For example, the diameter D3 may be greater than the diameter of the hole (e.g., the diameter D1 shown in FIGS. 4B and 5C) of the electrical wall box. Thus, the front portion 702 may be deformed to reduce its circumferential area such that the front portion 702 may be passed through the hole 406A, 406B, or 406C from the rear side 411 of the electrical wall box, for example. In addition, the tapering of the front portion 702 (i.e., the tapered region 711) as discussed above may also allow gland 700 to be easily installed into the hole of the wall box. Nonetheless, the shape of the front portion 702 (including, for example, flat ridge region 703) in addition to the stiffness ratio as discussed above may also ensure that once gland seal 700 is installed into a hole, it maintains its shape and is not easily displaced from the hole as a wire(s) and/or cable(s) are inserted into the gland seal.

The front portion 702 may be open (i.e., define an opening) at front surface 708 and may define a passage 716 that may extend from this opening, through the front portion, through the intermediate portion 704, and up to and through the rear portion 706 and terminate at a surface 714 of the rear portion (i.e., the front, intermediate, and rear portions may define passage 716). The passage 716 may have a uniform diameter D6 although the passage may also have a non-uniform diameter and in particular, may increase in size from the rear portion 706 towards the opening at surface 708 of the front portion 704. The diameter D6 of passage 716 may be configured to allow one or more electrical cables and/or electrical wires to enter the electrical wall box. In particular, the passage 716 may be sized such that electrical wires and/or electrical cables of varying thicknesses may be passed/received through the passage, and may be further sized that an electrical cable and/or electrical wire (e.g., electrical cable/electrical wire 322 of the sizes intended to be used with device 300, such as cables having diameters from 0.17 inches to 0.325 inches, or approximately from 0.17 inches to 0.325 inches for example), once inserted into the gland seal 700, does not experience any resistance and/or minimal resistance along the passage 716. This may help to ensure that gland seal 700 is not displaced from a hole 406A, 406B, or 406C, for example, of the wall box as a cable or wire is inserted into the gland seal and/or removed from the gland seal. As an example, diameter D6 may be 0.331 inches or approximately 0.331 inches, such as 0.331+/−0.005 inches along the length of passage 716. Alternatively, passage 716 may broaden (as discussed above) from 0.331 inches (or approximately 0.331 inches) at surface 714 of rear portion 706 to 0.355 inches or approximately 0.335 inches, such as 0.335+/−0.005 inches, at the opening at the surface 708 of front portion 702 One will recognize that other diameters and configurations are possible.

Turning now to the intermediate portion 704, it may be a section with a reduced area/reduced diameter (as compared to the diameter of intermediate surface 710 and the diameter of surface 712, for example) that is configured to be located within a hole of the electrical wall box (e.g., holes 406A, 406B, and 406C of the wall box 400) when the gland seal 700 is installed into the wall box. The intermediate portion 704 may have a diameter D4. The diameter D4 may be less than or equal to the diameter of the holes of the electrical wall box, for example, such that a surface along length 705 of the intermediate portion 704 rests within a respective hole and possibly touches the interior surface 413 that forms the hole. The intermediate portion 704 may have a length 705 that may be substantially equivalent to a thickness of the back plate of the electrical wall box 400 (e.g., such as back plate 404 shown in FIGS. 4A and 4B and FIGS. 5A, 5B, and 5C) thereby resulting in the intermediate surface 710 and surface 712 of rear portion 706 resting against/contacting opposing first and second sides of the back plate when the gland seal 700 is installed in the wall box. The passage 716 may extend through the intermediate portion 704. As an example, diameter D4 may be 0.492 inches (or approximately 0.492 inches, such as 0.492+/−0.005 inches), and length 705 may be 0.040 inches (or approximately 0.040 inches, such as 0.040+/−0.005 inches). One will recognize that other diameters and lengths are possible. As indicated above, the shape of intermediate portion 704 may be configured to have a shape similar to the shape of the hole of the wall box with which it is inserted (in this example, circular).

Turning now to the rear portion 706, as noted it may be configured to be located outside of or on the rear side 411 of the electrical wall box when the gland seal 700 is installed (i.e., on the exterior of the wall box) as shown in FIG. 5B. Rear portion 706 may have/define a first surface 712 (use of the term first surface is used herein for description purposes only) that may be configured to rest against/contact an exterior surface of the back plate at the rear side 411 of the electrical wall box when the gland seal 700 is installed, as indicated above. The first surface 712 may have a diameter D5 that may be equal to or larger than the diameter D3. As an example, diameter D5 may be 0.790 inches (or approximately 0.790 inches, such as 0.790+/−0.005 inches). One will recognize that other diameters and possible. The rear portion 706 may have a length D8 of 0.255 inches (or approximately 0.255 inches, such as 0.255+/−0.005 inches). One will recognize that other diameters are possible. The rear portion 706 may define a second surface 714 that may oppose the first surface 712 (use of the term second surface is used herein for description purposes only) and may also oppose surfaces 710 and 708. The passage 716 may terminate at an interior side of the second surface 714. The second surface 714 may be a membrane that defines two (e.g., first and second) areas of different thicknesses including a thin portion or area 720 (e.g., the star shape shown in the Figures) (use of the terms thin portion or area are used herein for description purposes only). For example, the thin portion 720 may have a reduced thickness when compared to the remainder of the second surface 714. As an example, the thickness of thin portion 720 may be 0.020 inches (or approximately 0.020 inches, such as 0.020+/−0.005 inches) and the remainder of the second surface 714 may have thickness 709 of 0.050 inches (or approximately 0.050 inches, such as 0.050+/−0.005 inches). One will recognize that other diameters and tolerances are possible. The thin portion 720 of the second surface 714 may be configured to receive an electrical cable and/or electrical wire when the cable/wire is inserted into the gland seal 700 and into the electrical wall box 400. For example, the second surface 714 and in particular thin portion 720 may be initially sealed and may be configured to be punctured by the electrical cable and/or electrical wire when the cable/wire is inserted into gland seal 700 and into the electrical wall box 400. The thin portion 720 may be configured to create an aperture or opening therethrough when the electrical cable and/or electrical wire is passed through the second surface 714/punctures the second surface. As a further example, the thin portion 720 may define a perforation configured to be punctured by the electrical cable and/or electrical wire. The thickness of thin portion 720 together with the stiffness ratio of the material from which the gland seal 700 is made may allow thin portion to puncture and not tear as an aperture is formed, and may also allow the formed aperture to increase in size/stretch to conform to the wire or cable inserted therein, thereby forming an airtight seal or a substantially airtight seal around the wire or cable. As another alternative, the thin portion 720 may define a partial aperture/opening (e.g., at the center of the thin portion 720) that may be configured to be increased in size (e.g., stretch) when the electrical cable and/or electrical wire is passed therethrough. This partial aperture may have diameter that is equal to or smaller than the diameter of the smallest wire or cable intended to be inserted into gland seal 700 so that the aperture stretches as a wire/cable is inserted therein. In other words, the size of the partial aperture may be based on the thickness of the electrical cable and/or electrical wire that may be inserted therein such that an airtight (e.g., substantially airtight) seal is maintained around the electrical cable and/or electrical wire. The configuration of thin portion 720 as discussed above may also be such that electrical cables and/or electrical wires having various thicknesses can be received therethrough while maintaining the airtight (e.g., substantially airtight) seal. For example, the thin portion 720 may be configured to receive an electrical cable and/or an electrical wire having a thickness/diameter in a range of 0.17 inches to 0.325 inches (or approximately this range) and maintain an airtight seal or substantially airtight seal around the wire or cable regardless of which size/diameter wire/cable is used in this range. Thin portion 720 may be further configured such that multiple wires or multiple cables may be inserted therein while maintaining an airtight (e.g., substantially airtight) seal. While thin portion 720 is described as being configured to receive cables/wires having diameters in the range of 0.17 inches to 0.325 inches, one will recognize that smaller diameter wires/cables may be used, with thin portion 720 maintaining an airtight seal. For example, thin portion 720 may be configured to receive electrical cables and/or electrical wires having a thickness in a range of 24 AWG to 6 AWG (which may be a diameter of about 0.02010 inches to 0.16200 inches). Similarly, thin portion 720 may also be configured to receive larger cables/wires (at least sized to pass through passage 716) and maintaining an airtight seal around such wires/cables.

The configuration of thin portion 720 as discussed above may also be such that as a wire or cable is inserted therein from a wall cavity, an airtight (e.g., substantially airtight) seal may be maintained around the electrical cable and/or electrical wire as indicated above. In addition, this airtight seal may be such that as the wire or cable is pushed and/or pulled through an aperture formed in the thin portion, the wire/cable does not experience substantial resistance such that the gland seal 700 remains secured to the electrical wall box as the electrical cable and/or electrical wire is forcibly passed therethrough. In addition, the passage 716 may be sized such that as the electrical cable and/or electrical wire enters the electrical wall box via the passage 716, the electrical cable and/or electrical wire again does not experience any resistance and/or little resistance along the passage 716. Again, this may ensure that the gland seal 700 remains secured to the electrical wall box as the electrical cable and/or electrical wire is passed there through.

The configuration of gland seal 700 and in particular the configuration of the second surface 714 and the thin portion 720 may be such that not only air is prevented from entering the electrical wall box and/or influencing a temperature measurement made within the sealed electrical wall box 400 when the electrical cable and/or electrical wire are received therein, but that water, dirt, and/or dust for example are also prevented from entering the electrical wall box The thin portion 720 may be star-shaped as shown herein or cross-shaped, etc. For example, the thin portion 720 may define a centrally located area 721 and one, two or more portions 723 that extend therefrom. The centrally located area may be any shape such as circular, rectangular, triangular, polygonal, etc., and may be configured to receive a wires(s) or cable(s) as described herein. The portion(s) 723 that extend from the centrally located area may be any shape such as circular, oval, rectangular, triangular, polygonal, etc. In general, this configuration (e.g., a star-shape) may ensure that thin portion 720 does not tear and/or minimally tears as a wire or cable is inserted therein and through the centrally located area 721. Although the thin portion 720 on the second surface 714 of the gland seal 700 is shown as being star-shaped, the thin portion 720 may be another shape such a diamond, a triangle, a circle, a semi-circle, a crescent, a polygon, and/or the like that allows for a substantially airtight seal between the electrical wall box and the wall cavity when a wire(s) or cable(s) is inserted therethrough. Although the gland seal 700 is shown as being one piece, the gland seal 700 may include two or more pieces that are configured to be secured to one another.

While gland seal 700 is described herein as having certain dimensions, one will recognize that other dimensions may be used. For example, the gland seal may be made larger or smaller with the sizes described herein being proportionally increased/decreased accordingly.

Although the gland seals 408A, 408B, and 408C are shown as being separate gland seals like that of gland seal 700, the gland seals 408A, 408B, 408C may be formed/molded as one gland seal (e.g., one integral unit) with respective front portions 702 and intermediate portions 704 that may be inserted into respective holes 406A, 406B, and 406C, and with the single gland seal having respective thin portions 720 for each hole. As another example, gland seals 408A, 408B, and 408C may be over molded (e.g., on the exterior or interior surface of back plate 404) as a single seal configured to seal the holes 406A, 406B, 406C. Here, the overmolding may have the characteristics of the second surface 714 having a thin portion 720 positioned over each hole. One will recognize that other variations are possible.

While wall box 400 and gland seals gland seals 408A, 408B, 408C, and 700 are described herein with respect to temperature control devices, one will recognize that the wall box and gland seals may be used other types of electrical devices.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure.

What is claimed is:

1. A wallbox system to prevent the ingress of air from a wall cavity into a wallbox, the wallbox system comprising:
    a housing having an internal space defined by:
        a peripheral wall having a front edge and a back edge;
        a back cover coupled to the back edge of the peripheral wall, the back cover including a plurality of apertures; and
        a flange coupled to at least a portion of the front edge of the peripheral wall;
    a plurality of glands, each of the plurality of glands inserted into a respective one of the plurality of apertures to seal the aperture and prevent air incursion into the internal space of the housing;
        each of the plurality of glands including a sidewall, an open end, and a closed end; and
        each of the plurality of glands formed of a resilient material having a first thickness;
            wherein the closed end of each of the plurality of glands includes a membrane portion having a second thickness less than the first thickness centered on the closed end of the gland, the membrane portion to accommodate a penetration and a bidirectional passage of an electrical conductor while the resilient material forming the gland maintains contact with an exterior surface of the electrical conductor to form an air-tight seal therebetween.

2. The wallbox system of claim 1:
    wherein each of the plurality of apertures comprises a circular aperture; and
    wherein each of the plurality of glands comprises a generally cylindrical structure insertable into a respective one of the plurality of apertures.

3. The wallbox system of claim 2 wherein each of the plurality of glands comprises a sidewall portion having a first outside diameter portion, a second outside diameter portion, and a third outside diameter portion;
    wherein the second outside diameter portion is less than the first outside diameter portion and less than the third outside diameter portion.

4. The wallbox system of claim 3:
wherein each of the plurality of apertures comprises an aperture having an inside diameter;
wherein the first outside diameter portion of each of the plurality of glands is greater than the inside diameter of each of the plurality of apertures; and
wherein the third outside diameter portion of each of the plurality of glands is greater than the inside diameter of each of the plurality of apertures.

5. The wallbox system of claim 4 wherein the second outside diameter portion of each of the plurality of glands is equal to the inside diameter of each of the plurality of apertures.

6. The wallbox system of claim 4 wherein the second outside diameter portion of each of the plurality of glands contacts the inside diameter of each of the plurality of apertures to form an air-tight seal therebetween.

7. The wallbox system of claim 3:
wherein the back cover of the housing comprises a member having a first thickness; and
wherein the second outside diameter portion comprises a portion having a length equal to the first thickness.

8. The wallbox system of claim 1 wherein the membrane portion comprises a polygonal membrane portion centered on the closed end of the gland.

9. The wallbox system of claim 1 wherein the membrane portion comprises a star-shaped membrane portion centered on the closed end of the gland.

10. The wallbox system of claim 1, further comprising:
a thermostat insertable into the wallbox.

11. The wallbox system of claim 1 wherein the housing further comprises:
a plurality of channels formed on an external surface of the peripheral wall, wherein each of the channels includes a circular channel having a first diameter and an open throat portion having a width less than the first diameter.

12. The wallbox system of claim 11 wherein the housing further comprises:
a plurality of screws, each of the plurality of screws inserted within a respective one of the plurality of channels.

13. The wallbox system of claim 12 wherein the housing further comprises:
a plurality of retention members reversibly rotatable between a first position in which the retention member conforms to an external surface of the peripheral wall of the housing to a second position in which at least a portion of the retention member extends at an angle from the external surface of the peripheral wall of the housing.

14. The wallbox system of claim 13:
wherein each of the plurality of retention members includes a drum portion and a wing portion attached to the drum portion;
wherein drum portion of each of the plurality of retention members comprises a female threaded, hollow, cylindrical member having an outside diameter less than the first diameter of the circular channel and greater than the width of the open throat portion of the channel such that the drum portion of the retention member is trapped within the channel; and
wherein the wing portion of each of the plurality of retention members comprises a member having a thickness less than the width of the open throat portion of the channel.

15. The wallbox system of claim 14:
wherein the drum portion of each of the plurality of retention members receives a respective one of the plurality of screws such that the drum portion travels along a length of the screw as the screw is rotated in either direction.

* * * * *